(12) United States Patent
Caudle

(10) Patent No.: US 8,685,150 B1
(45) Date of Patent: Apr. 1, 2014

(54) TEMPERATURE PUMP PASSIVE FILTERS AND AUTOMATED DEVICES

(76) Inventor: Joseph Edward Caudle, Tampa, FL (US)

( * ) Notice: Subject to any disclaimer, the term of this patent is extended or adjusted under 35 U.S.C. 154(b) by 399 days.

(21) Appl. No.: 12/930,305

(22) Filed: Jan. 3, 2011

Related U.S. Application Data

(60) Provisional application No. 61/335,316, filed on Jan. 5, 2010, provisional application No. 61/342,284, filed on Apr. 12, 2010.

(51) Int. Cl.
*B01D 59/26* (2006.01)

(52) U.S. Cl.
USPC .................................. 96/108; 96/134; 96/147

(58) Field of Classification Search
None
See application file for complete search history.

(56) References Cited

U.S. PATENT DOCUMENTS

| | | | | |
|---|---|---|---|---|
| 4,247,315 A | * | 1/1981 | Neumann | 55/350.1 |
| 5,907,908 A | * | 6/1999 | Cunanan et al. | 34/61 |
| 5,914,413 A | * | 6/1999 | Andersson et al. | 55/378 |
| 5,914,456 A | * | 6/1999 | LeConey et al. | 96/121 |
| 6,041,669 A | * | 3/2000 | Brassell et al. | 73/864.74 |
| 6,395,074 B1 | * | 5/2002 | Mastromatteo | 96/135 |
| 6,423,122 B1 | * | 7/2002 | Kelders | 96/119 |
| 6,767,521 B1 | * | 7/2004 | Vogt et al. | 422/306 |
| 2009/0143954 A1 | * | 6/2009 | Leustek et al. | 701/102 |

* cited by examiner

*Primary Examiner* — Robert Clemente
*Assistant Examiner* — Phillip Shao

(57) ABSTRACT

Embodiments of passive air pollution filters designed for providing efficient adsorption of fungal spores, airborne bacteria, small hydrocarbons, viruses, prions, insect parts, hyphal parts, pollens, other allergens, radon gas, and other small air pollutants, both gaseous and particulate, from cool air are disclosed. Each embodiment comprises a filter bag portion, attractant mineral, a filter container, and a means of supporting the filter assembly. Stationary filters must be replaced and reprocessed periodically. Permanent passive air filtration coatings for building materials, which prevent condensation and growth of mold from occurring in building walls and in other structures, are disclosed. Automated temperature pump passive filtration devices, which automatically remove excess humidity, odors, particulate air pollutants, both mineral and biological, gaseous air pollutants, and allergens from enclosed volumes of air at a temperature of less than 26-27° C., about 80° F., are also disclosed.

20 Claims, 32 Drawing Sheets

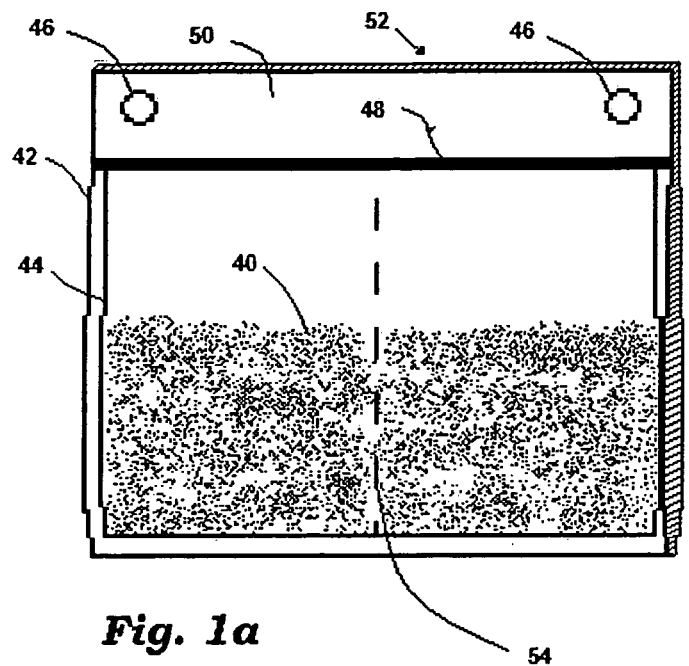
Fig. 1a
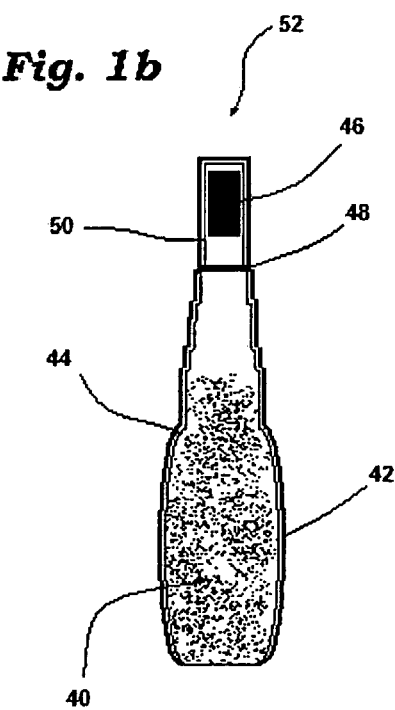
Fig. 1b
Fig. 1

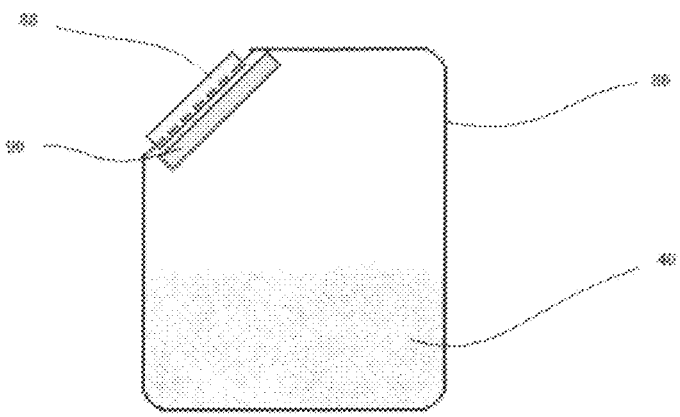
*Fig. 4a*
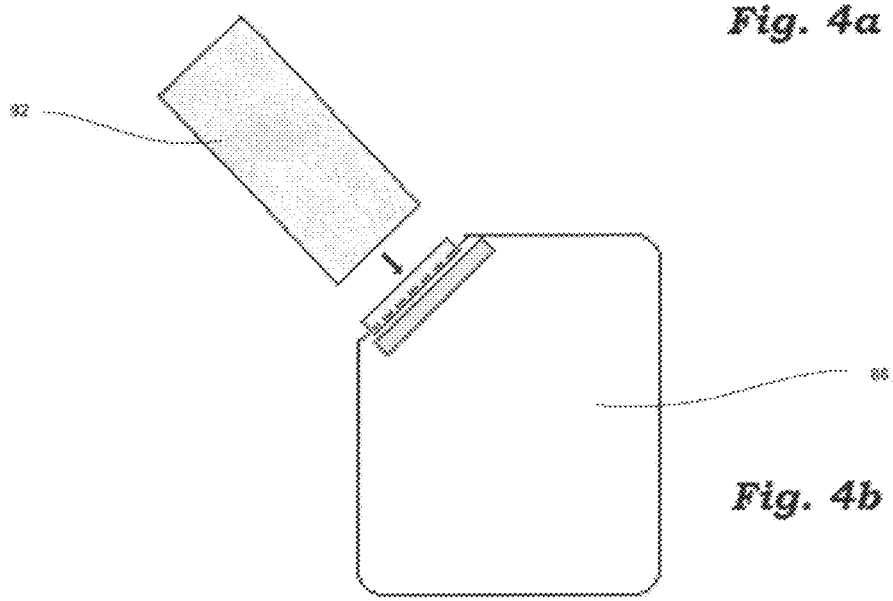
*Fig. 4b*
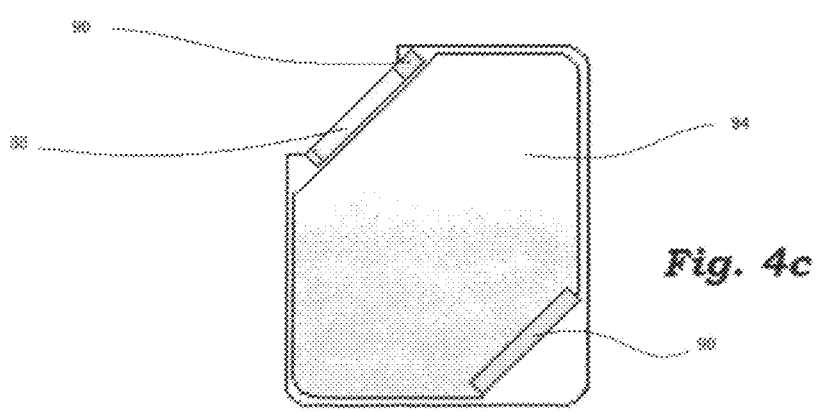
*Fig. 4c*
*Fig. 4*

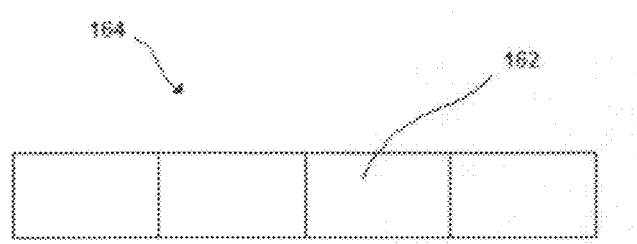
Fig. 11a
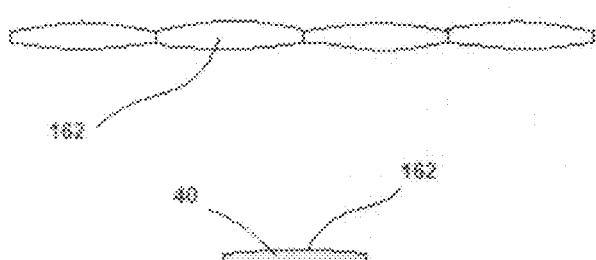
Fig. 11b
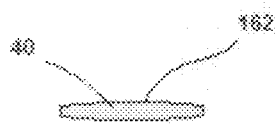
Fig. 11c
Fig. 11

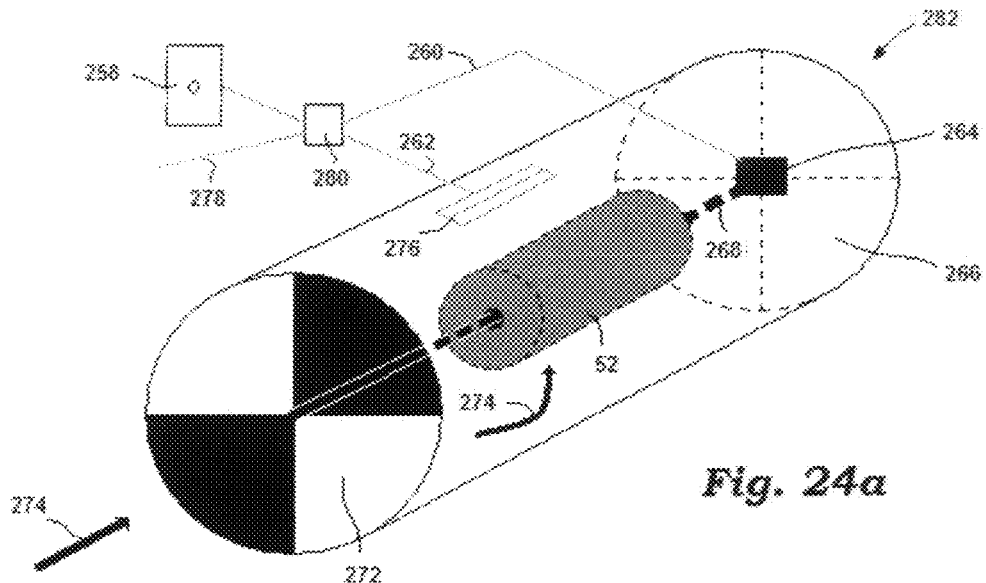
Fig. 24a
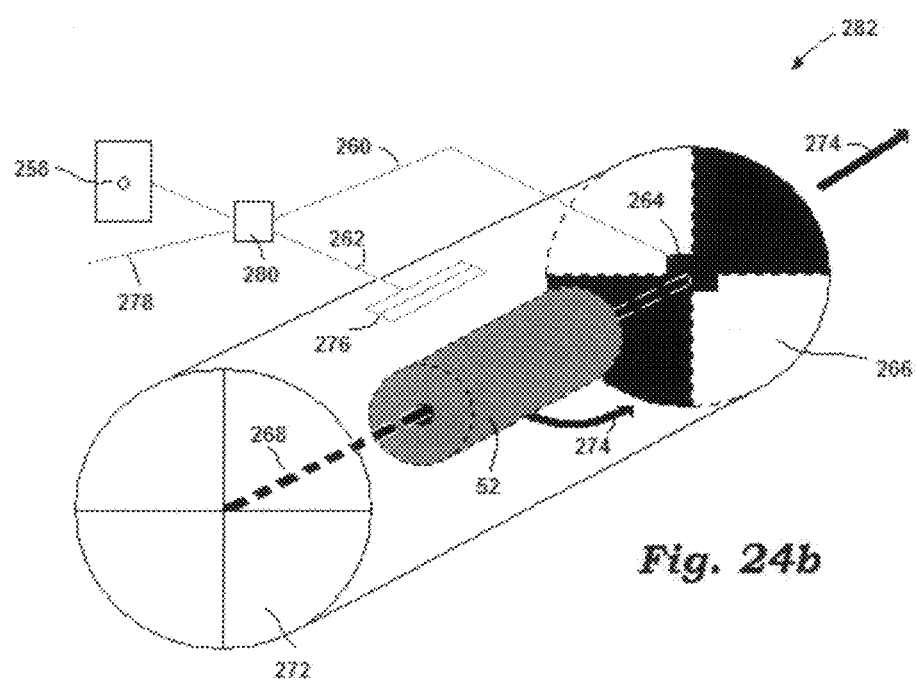
Fig. 24b
Fig. 24

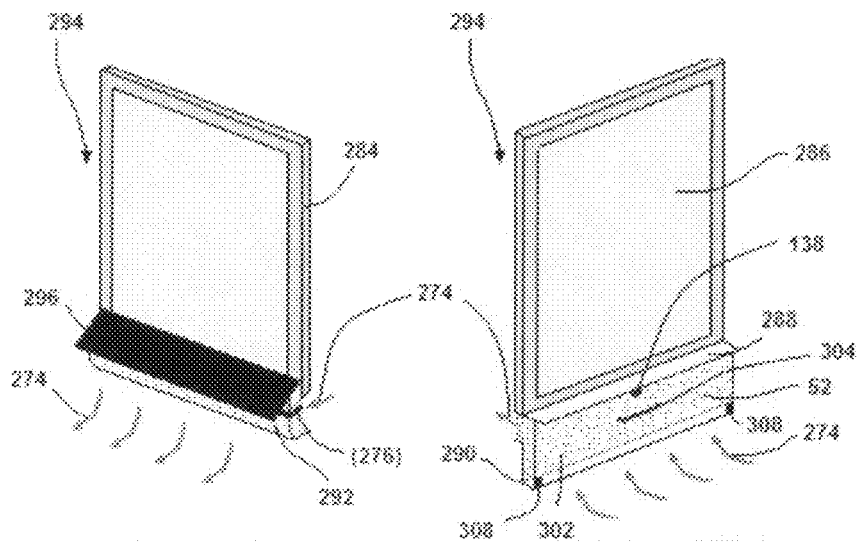
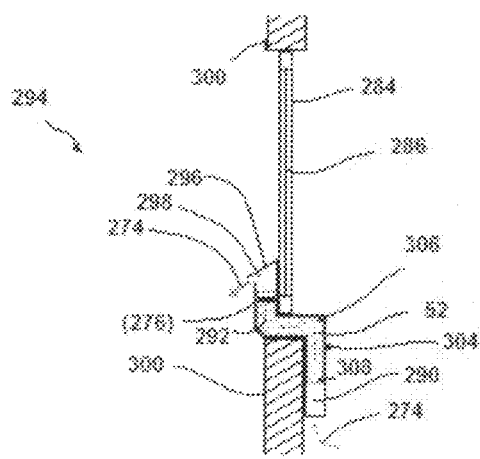
Fig. 27a    Fig. 27b
Fig. 27c
Fig. 27

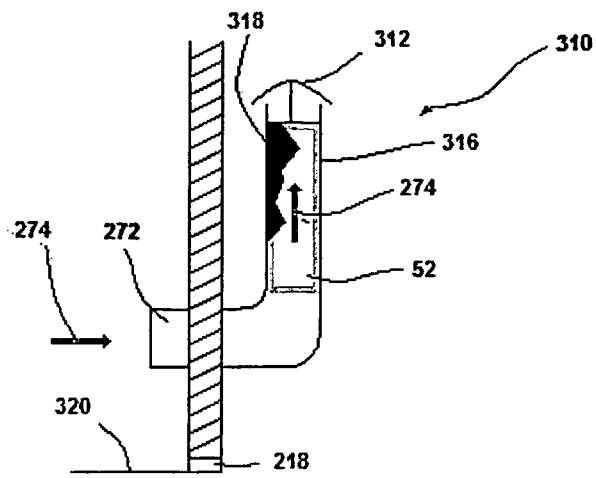
Fig. 28a
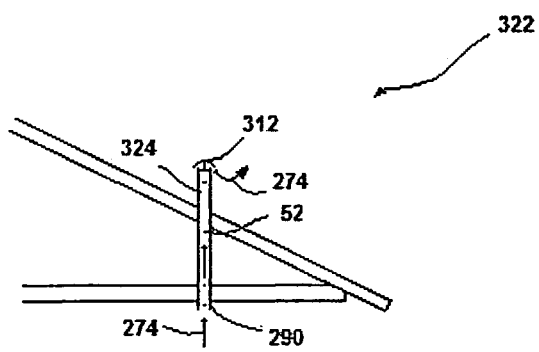
Fig. 28b
Fig. 28

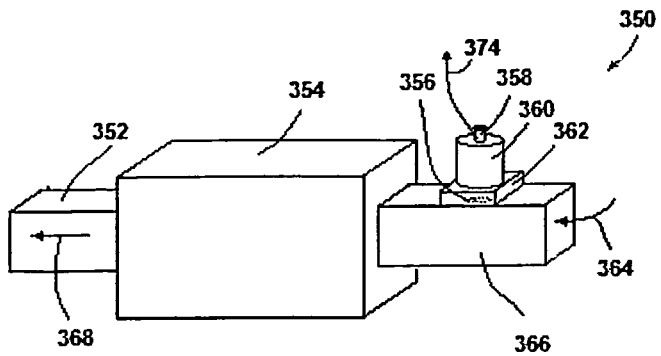
*Fig. 31a*
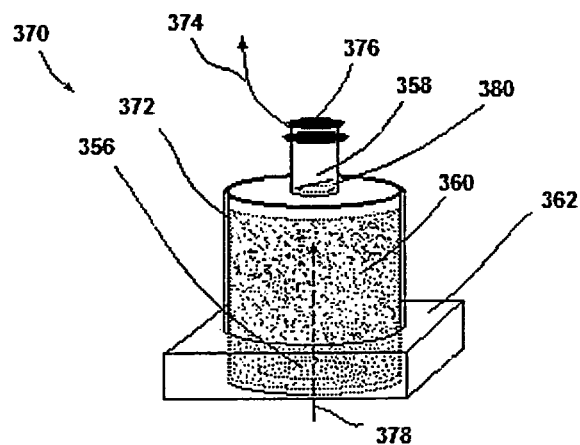
*Fig. 31b*
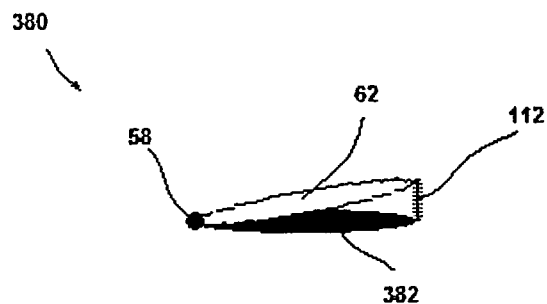
*Fig. 31c*
*Fig. 31*

TEMPERATURE PUMP PASSIVE FILTERS AND AUTOMATED DEVICES

CROSS-REFERENCE TO RELATED APPLICATIONS

This application claims the benefit of provisional patent application Ser. No. 61/335,316, "Adjacent Flow Passive Filters for Elimination of Indoor Air Pollution," filed 2010 Jan. 5 by the present inventor, and provisional patent application Ser. No. 61/342,284, "Automated Temperature Pumping Devices," filed 2010 Apr. 4, also by the present inventor, both of which applications are hereby incorporated herein in their entirety.

FEDERALLY SPONSORED RESEARCH

Not Applicable

SEQUENCE LISTING

Not Applicable

BACKGROUND

1. Field

This application relates to air filters, filter coatings and automated air filtering devices containing amorphous silica (natural diatomaceous earth).

2. Prior Art

The inventor has worked with diatomaceous earth for the past ten years. In 2009, he discovered characteristics of amorphous silica (natural diatomaceous earth) that makes it an excellent passive air filter material to eliminate indoor air pollution in various patentable embodiments. These characteristics, which are described herein, allow passive filters of amorphous silica (referred to in provisional patent application 61/335,316, "Adjacent Flow Passive Filters for Elimination of Indoor Air Pollution," filed 2010 Jan. 5), to be utilized in the temperature pump cycle described herein. The reason for this name, "adjacent flow passive filters," in provisional patent application 61/335,3316 was that the filters discussed therein were not placed in the stream of a moving gas, but rather adjacent to it, to allow the mineral matrix to attract pollutants into the filters for purification of the gas. Air (or more generally, the gas being purified) was not forced through the filters. Subsequent research by the inventor showed that amorphous silica may be used both in designs in which the filters are adjacent to the air flow, and in designs for which the amorphous silica filter is actually in a slow air flow leaking through the mineral, drawing out pollutants by osmosis (See "Temperature pipe" section of provisional patent application Ser. No. 61/342,284, "Automated Temperature Pumping Devices," filed 2010 Apr. 4. Accordingly, the inventor has renamed the passive filters subject to this patent application the "temperature pump passive filters" to cover both design possibilities.

Further, as taught in provisional patent 61/342,284, "Automated Temperature Pumping Devices," filed 2010 Apr. 4, also by the present inventor, the inventor has developed non-obvious, original automated devices using temperature pump passive filters. The subject automated temperature pumping devices use several different embodiments of temperature pump passive filters to adsorb pollutants out of an enclosed air volume into amorphous silica powder at a low temperature (less than about 26-27° C.). Subsequently, these devices (through a variety of means) increase the temperature of the pollutant-filled amorphous silica powder, increasing Brownian motion of the amorphous silica and the pollutant molecules within it, causing the amorphous silica to desorb the pollutants, thereafter venting them into the atmosphere.

The first public use of temperature pump passive filters (previously "adjacent flow passive filters") for elimination of indoor air pollution began on Apr. 14, 2009. Provisional patent application 61/335,316 was filed by the inventor on 2010 Jan. 5.

Natural diatomaceous earth (amorphous silica) should be distinguished from other desiccants, in that it is a weak desiccant, forming a weak bond with water and other pollutant molecules under 26-27° C., which bond can easily be overcome by Brownian motion at temperatures over 26-27° C. Its transition temperature from adsorption to desorption thus lies just above room temperature (20-25° C.). This transition temperature is a critical element of the embodiments of the temperature pump passive filters and automated temperature pump device embodiments discussed herein.

In air, at temperatures less than the transition temperature, amorphous silica acts as a weak desiccant, and adsorbs gasses and micro-droplets of water containing a wide variety of small particulates (which serve as the nucleating agents for those micro-droplets) from the air. The nucleation agents have primarily positive charge, which attracts water molecules having a net negative charge. Thus, in humidified air, each pollutant particle immediately starts drawing a coating of water particles along with it. Amorphous silica attracts water molecules and other pollutants in a gas in a low temperature range, from at least −46° C. (probably lower, but experiments have only been conducted down to this temperature) up to about 26-27° C.

The concepts discussed in this regular patent application apply to pure natural diatomaceous earth (amorphous silica) of various grades of fineness. While the embodiment of the filters discussed herein could use calcined diatomaceous earth (a carcinogen), the inventor specifically sought out natural "food grade" diatomaceous earth with very low Cristabolite content (non-carcinogenic), to replace prior art humidity control filters based on calcined diatomaceous earth, and would not want to be responsible for patenting devices based on a carcinogen. Using calcined diatomaceous earth for these inventions would expose both manufacturing personnel and consumers of products made on the basis of these inventions to a dangerous carcinogen.

Any references to air herein should be understood to include other gasses which may be passively filtered with amorphous silica. It should be clear that the temperature pump cycle identified herein works with amorphous silica in various gasses, to attract a huge variety of contaminants, and in various temperature ranges, from extremely cold temperatures to approximately 26-27° C. The temperature pump passive filters and automated temperature pump device embodiments discussed herein are not intended to be limiting, but to be illustrative, and to support the author's patent claim to those non-obvious temperature pump passive filter embodiments and filter coatings, as well as to automated temperature pump device embodiments utilizing amorphous silica in the temperature pump cycle.

Function of Temperature Pump Passive Filters in a Gas

One can think in terms of partial pressures of gasses or adsorbable contaminants in air to understand the attraction of amorphous silica for those gasses or contaminants. The numerous adsorbent cavities in amorphous silica start out having effectively zero partial pressure of any gasses or contaminants, other than the gas in which it is immersed (in this case, air). When other gasses or contaminants which can be adsorbed by amorphous silica are introduced into a closed air volume in which amorphous silica is present, an attraction vector is set up toward the amorphous silica, because of the gradient of greater to lesser partial pressure which is established.

As the mineral adsorbs greater and greater numbers of molecules or small particulates, the partial pressure of each of these in the mineral gradually approaches their partial pressure in the closed air volume, until the attraction vector is decreased, and finally eliminated. The temperature range for amorphous silica's attraction of contaminants in air (at least −46° C. to about 26-27° C.) is important, because the mineral can only attract gasses or particulates when the Brownian motion of the pollutants is small enough for them to be retained within the mineral.

The in-stroke part of the temperature pump cycle occurs within this lower temperature range, at which the mineral adsorbs water micro-droplets and other molecules or groups of molecules having a higher partial pressure in air into the adsorptive surfaces of its diatoms.

Because of the water molecule's design, in confined regions the water molecules can more readily escape the adsorptive traps when the partial pressure of water gas (the Relative Humidity) outside the filter decreases, than can the pollutants, which originally served as the nucleation agents for the water micro-droplets. Water's tetrahedral design (a Y for which two of the legs may squeeze together, allowing the molecule to escape from tight spaces) may well explain why it can escape from confined spaces more easily than, say, odor molecules, viruses, airborne bacteria, mold spores, hyphal fragments, insect fragments or pollutant gas molecules in the same temperature range. Because of this effect, water more easily desorbs from amorphous silica than do the other pollutants when the relative humidity outside the amorphous silica decreases, even though the temperature remains in the adsorption range.

While the amorphous silica remains in the low-temperature range described above, the pollutants are stored in the temperature pump passive filter. This is the storage part of the temperature pump cycle. Because of its porous crystalline structure, amorphous silica has a great ability to adsorb and store large numbers of pollutant particulates and/or molecules.

Amorphous silica desorbs both water molecules and small particulates at temperatures above about 26-27° C. for the temperature pump cycle out-stroke, due to the increased Brownian motion of the molecules adsorbed into the amorphous silica and the Brownian motion of the amorphous silica ($Si_2O$) molecules themselves. This temperature represents the approximate transition temperature from adsorption to desorption for amorphous silica in air at sea level, and can vary due to atmospheric pressure and viscosity of the specific medium in which the amorphous silica is located.

As stated above, the key to the temperature pump cycle concept is that water micro-droplets and other air pollutants only make a weak adsorbent bond to the amorphous silica, which Brownian motion can easily overcome at higher temperatures. This allows devices to be designed which use this pumping mechanism to cleanse air (and other gasses) of excess humidity and many other pollutants for a number of beneficial purposes.

Amorphous silica also adsorbs an extremely wide variety of pollutant gasses from an enclosed air space. As previously mentioned, microscopic spaces in amorphous silica initially have zero partial pressure of whatever pollutant may be present, so an attraction vector is set up, attracting the pollutant gas molecules to be adsorbed into the matrix structure of the amorphous silica. Because of amorphous silica's great inner storage capacity for gas molecules, a number of pollutant gasses can be reduced to undetectable levels in the room air for extended periods of time when a sufficient mass of amorphous silica is present. Tests for ethylene gas, chlorine gas and acetic acid molecules have been conducted. With temperature pump passive filters at work protecting a room, many small particulates and pollutant gasses can be virtually eliminated within the enclosed air space.

This regular patent application discloses embodiments of stationary amorphous silica temperature pump passive filters and filter coatings for use in eliminating excess humidity, small particulates and pollutant gasses from indoor air. Additionally, it discloses automated devices using temperature pump passive filters, discussed below.

Automated Devices Using Temperature Pump Passive Filters

As buildings have gotten more and more tightly designed to minimize air leakage and energy use for heating, ventilation and air conditioning (HVAC), indoor air pollution has become a greater and greater threat to the health of persons working or residing in those buildings. Bacterial diseases such as Legionnaire's disease (*Legionella*), MRSA and gas gangrene (*Constridium perfringens*) have become of great concern in public accommodations and hospitals. This regular patent application addresses new and unique ways to successfully eliminate excess humidity and/or indoor air pollution, including all of the species of airborne bacteria, molds, funguses, viruses and other pollutants, including various gaseous pollutants, listed below. Additionally, the broad-band attraction of amorphous silica for pollutants in air means that this regular patent application applies to the adsorption of any such pollutant particles or molecules present in the air (or gas) being purified. The automated temperature pumping device embodiments disclosed herein are devices which use amorphous silica passive filters (see Provisional Patent Application 61/335,316) to attract air pollutants and adsorb them into the mineral matrix of amorphous silica at temperatures below 26-27° C. (about 80° F.). This temperature is hereinafter referred to as the "transition temperature" for amorphous silica. The automated temperature pumping device then recycles the filter by closing the air intake from the indoor air, opening an outlet to the outdoor air, and heating the amorphous silica filter to desorb the pollutants when the temperature of the amorphous silica rises above the transition temperature. Accordingly, the filters need no replacement, unless the filter bag material becomes soiled due to long-term use, or unless the mineral itself becomes permanently polluted by some heavy pollutant load (such as by sticky hydrocarbons). In practice, the currently used temperature pump passive filter bag material has gotten soiled in a number of applications, but the mineral has never to the inventor's knowledge become so soiled as to become ineffective in its air-cleansing role. Molds, pollens, bacteria and funguses have not been observed growing in the amorphous silica powder. It may, however, be advisable to change filters annually to avoid even the possibility of contamination.

The automated temperature pumping device embodiments disclosed herein fall into two categories:

The temperature pump, in which excess humidity, small particulates and pollutant molecules at a temperature of less than about 26-27° C. are drawn by diffusion into a filter bag filled with amorphous silica in a cavity exposed to the indoor air volume being purified; then the port allowing indoor air access to the filter is closed, a port allowing the filter access to the outdoor air is opened, and the filter bag is heated to a temperature above the transition temperature of 26-27° C., allowing the excess humidity and air pollutants to desorb from the filter into atmospheric air; and:

The temperature pipe, in which a temperature gradient is established in a pipe containing a filter bag of tightly packed amorphous silica, so that the temperature higher up in the pipe is sufficient to desorb excess humidity, small particulates and pollution molecules out of the pipe into the atmosphere, creating a "draft" of excess humidity, small particulates and pollution molecules upward from the lower part of the pipe, which remains at a temperature cool enough to attract excess humidity, small particulates and pollution molecules out of the indoor volume of air being purified.

Key to the temperature pump cycle concept is that water molecules and other air pollutants make a weak adsorbent bond to the amorphous silica at lower temperatures, which Brownian motion can easily overcome at higher temperatures. Thus a temperature pump makes it possible to "pump" excess humidity, particulate pollutants and gaseous pollutants into the amorphous silica matrix at low temperatures, and "discharge" the humidity and pollutants at a higher temperature. This allows devices to be designed which use this pumping mechanism to cleanse air (and other gasses) of excess humidity and many other pollutants for a number of beneficial purposes.

As detailed above, the inventor has found that the capacity of amorphous silica for many types of pollutants, both particulate and gaseous (including water vapor) is remarkable. Passive filters utilizing amorphous silica powder in a melt-blown filter cloth enclosure can be compared to attaching a gigantic tank full of perfectly clean air to an indoor volume of air-conditioned air. Osmosis carries virtually all of the indoor air pollution (and much excess humidity) into this passive filter "tank" while the "tank" is cool, below the transition temperature. However, if the "tank" is heated above the transition temperature, all the particulate and gaseous pollutants (including excess humidity) are discharged out of the "tank." If the "discharge pipe" for this "tank" releases the humidity and pollutants to the outside air, the indoor volume of air that is cleaned typically ends up much cleaner than the outside air. Brownian motion in the heated mineral flushes out pollutants and water molecules in the mineral, restoring the "tank" to its perfectly clean state, capable once again of adsorbing excess humidity and both gaseous and particulate pollutants, down to 0 parts per billion for some pollutant gasses, and down to nearly 0 spores/m$^3$ for fungal and bacterial spores.

Extensive experimentation described in preliminary patent application Ser. No. 61/335,316 and Ser. No. 61/342,284 using the temperature pump cycle with the temperature pump passive filters and automated devices described therein, achieved remarkable cleansing of indoor air pollution, including elimination of at least the following:

excess humidity (water vapor)
ethylene gas
chlorine gas
acetic acid molecules
other acid molecules
objectionable odors
ascospores
aspergillus spores
penicillium spores
basidiospores
cladosporium spores
stemphylium spores
most of the total fungal spore count
mold spores
airborne bacteria in general
small hydrocarbons, viruses and prions (by inference from experimental results)
pollens
hyphal (mold) fragments
insect fragments
dust and dust mites The results of the inventor's experimentation indicate that the nucleation agents around which water micro-droplets form, such as the above list of fungal spores, airborne bacteria, pollens, hyphal fragments and insect fragments, are adsorbed and trapped in the amorphous silica mineral interfaces at temperatures under about 26-27° C. (about 80° F.) until the temperature increases beyond that transition temperature. Larger particulates, such as pollens, are attracted to the surface of the amorphous silica particles, or to the filter enclosure material. Above that temperature, Brownian motion dislodges the water molecules, captured nucleation agents/pollutants (such as the above bacterial spores, mold spores and fungal spores), odors and pollutant gasses, allowing them to float freely into the surrounding air. Since viruses are known to be nucleation agents for both ice crystals and micro-droplets of water, the inventor's research indicates that very small nucleation agents, such as prions and viruses are also adsorbed by temperature pump passive filters. The fact that amorphous silica also attracts and retains small molecules such as water ($H_2O$), ethylene gas ($C_2H_4$), chlorine gas ($Cl_2$), and acetic acid ($CH_3COOH$) argues that viral particles between the size of the above molecules and the size of larger biological particulates (such as spores and airborne bacteria) are adsorbed.

Many temperature pump passive filters are not placed in the stream of a moving gas, but rather adjacent to it, to allow the mineral matrix of amorphous silica to attract pollutants into the filters. Calcined diatomaceous earth functions well in such filters, but calcined diatomaceous earth is a carcinogen, whereas natural diatomaceous earth is non-carcinogenic. As a result, "food quality" amorphous silica is the filter material exclusively referred to in this regular patent application, In some uses (see temperature pipe section below), temperature pump passive filters may be placed in a slow flow of air and pollutants. However, the slow flow of pollutants (and a little air) goes directly through tightly packed amorphous silica, being drawn by a diffusion gradient which is created by a temperature differential in the mineral. The pollutants and air are not forced through the filter by high air pressure.

The temperature pump cycle can be effectively utilized by the use of the new designs of temperature pump passive filters detailed below for the specific new purposes enumerated. The following provides a discussion of the prior art, followed by a detailed discussion of how new designs (and new uses) of temperature pump passive filters differ from the prior art in new and non-obvious ways, and thus are patentable.

As opposed to other filter concepts, such as the filter discussed in U.S. Pat. No. 4,824,450 (Howard), the amorphous silica filter (and other mineral filters using the temperature pump cycle) does not provide for high pressure air flow directly through the filter material. The aforesaid patent uses an air flow directed through filter bags formed of HEPA paper to actively filter out particulates by directly catching them in the HEPA paper matrix. This builds up a "cake" of particulates on the catch side of the filter, and ultimately decreases air flow with the blockage of the filter. The temperature pump passive filters function at a low temperature (below about 26-27° C.), not directly in a high pressure air flow, to attract micro-droplets of water and their nucleation agents—the particulates the filters adsorb and store. Since the filters are not in the direct flow of high pressure air, they do not block the air flow, and do not build up a caked layer of particulates. In designs of the temperature pump passive filters (See "Temperature pipe" section below) that provide for direct pollutant and air flow through the filter material, the slow flow of pollutants (and a little air) goes directly through tightly packed amorphous silica, being drawn by a diffusion gradient which is created by a temperature differential in the mineral. The pollutants and air are not forced through the filter by high air pressure.

U.S. Pat. No. 4,604,110, (Frazier) provided for filter elements containing a mixture of silica gel, activated charcoal and zeolite. Such a mixture would make the temperature pump cycle as described in this regular patent application inoperable, since the temperature pump cycle defined herein operates close to room temperature, with only moderate heating of the filter element required. Activated charcoal and zeolite have transition temperatures too high to allow cleansing of the filter material by solar heating, or by mild heating due to a heating element or heating jacket. For example, zeolites must be dehydrated at temperatures between 100° C.-300° C., compared with the effective desorption of water and pollutant molecules starting just above 26-27° C. for amorphous silica. The key to the temperature pump passive filter design is reusability. Such high drying temperatures would not be consistent with reusing the filters as designed. Similarly, the key to the automated devices using the temperature pump passive filters is the ability to recycle the filters (with only mild heating) through repeated cycles of adsorption and desorption of water molecules, particulate pollutants, and pollutant gases and molecules. Use of zeolites or activated charcoal would make recycling of the filter material impossible with the designs disclosed herein. A further distinction of temperature pump passive filters from the fan-driven filtration system in U.S. Pat. No. 4,604,110 is that temperature pump passive filters require no fan or other electrical motor or pump to force air through the filters, but rather, they use osmosis to effect gradual, but very complete filtration of indoor air.

U.S. Pat. No. 4,337,276 (Nakamura et al) disclosed a storage container containing freshness keeping agents for vegetables and fruits, consisting essentially of a particulate composition which contains at least two components selected from the group consisting of zeolite, bentonate and activated carbon. The freshness keeping agent absorbs ethylene gas, etc. generated from vegetables and fruits, thereby preventing them from over-ripening, softening, etc. Again, use of zeolites and activated carbon negate the use of the temperature pump cycle at temperatures near room temperature. Amorphous silica can achieve similar success in adsorbing ethylene gas, but operates in a moderate temperature range that allows the temperature pump cycle as described herein to cleanse filters using amorphous silica as a filter material.

U.S. Pat. No. 2,231,768 (Seibert, et al.) disclosed a five-stage air purification system which uses an air compressor to blow compressed air through (1) and oil and water coalescer filter; (2) an adsorbent or desiccant dryer; (3) and oil vapor adsorber; (4) an after-filter; and (5) a bacterial-retentive final filer. This design is completely different from the present regular patent application in the following respects: (1) The temperature pump passive filters do not have compressed air blown through them; rather, the amorphous silica in the passive filter is allowed to attract in the pollutants through osmosis, a much more gradual, and more effective filtration process which allows the filtration of the very smallest and most unhealthful pollutants present in the air; (2) the amorphous silica is used as a passive filtration agent for all pollutants in the temperature pump filter designs, while U.S. Pat. No. 2,231,768 utilizes activated silica gel only as a possible desiccant, to remove water and hydrocarbons (not other pollutants), and relies on other filtration agents which block the high-speed flow of the air to remove pollutants; (3) The temperature pump filtration cycle requires no motors or other air pumps to move the air to be filtered. This means that near-perfect air purification is achieved with no electric power being expended in moving the air—a major utility-saving feature; (4) The temperature pump designs disclosed herein do not have the disadvantage of having compressed, high speed air picking up particles of amorphous silica and possibly discharging them into the purified air. U.S. Pat. No. 2,231,768 takes special precautions (further slowing down airflow) to prevent desiccant particles from entering the purified air; (5) The temperature pump filter designs disclosed herein are all completely reusable with the application of a minimum amount of natural (solar) or other heating. U.S. Pat. No. 2,231,768 makes no mention of reusability of filters, and from the design it may be inferred that its filters are designed for one-time use.

The disclosed designs of temperature pump passive filters make the entire volume of the mineral contained in the filter available for adsorption of pollutants, not just the surface as in a HEPA filter. The stationary filters are generally placed adjacent to the air flow, and gradually attract pollutants into the mineral matrix. A caked layer does not generally appear on the outside of the filter. More pollutants are adsorbed into the large mass of the filter material instead.

Patentable embodiments of different types of passive air filters using the temperature pump cycle are designated as the temperature pump passive filters in this regular patent application.

Another benefit of temperature pump passive filters is that very small particulates ranging down to the size of viruses can be adsorbed, because they are attracted into the mineral matrix that effectively holds them until the temperature increases, allowing them to escape. HEPA filters must allow smaller particles through the paper matrix, because filter pores small enough to catch very small, sub-micron sized particles do not allow adequate air flow through the filtering material.

Prior art not originated by the inventor, but used by the inventor and others for humidity control for more than one year prior to this regular patent application, includes:

Small, home refrigerator and commercial reach-in refrigerator filters, having an inner cloth filter bag to contain the mineral, and either a plasticized cardboard box with holes cut in it to allow air access, or a plastic exterior container with holes in it to allow air access. The container is held to the wall of the refrigerator with adhesive hook and loop strips. The mineral used was calcined diatomaceous earth (which is carcinogenic), containing up to one-third marble dust by weight.

Filters with a filtration bag containing approximately one kilogram of calcined diatomaceous earth (carcinogenic), surrounded by a plastic clamshell, made up of an outer and inner shell, which connect into each other by means of formed plastic snaps. The entire assembly slides into a metal or plastic bracket screwed to the ceiling or wall of a refrigerator or freezer.

These calcined diatomaceous earth filters were used for the purpose of absorbing humidity, drying the refrigerator, extending the life of produce, and eliminating odors. They were not used for the purpose of adsorbing airborne particulate pollutants, spores or bacteria in air-conditioned or refrigerated spaces. These possibilities were unknown at the time of their use. Furthermore, they utilized a mixture of carcinogenic calcined diatomaceous earth and marble dust, not pure, non-carcinogenic natural amorphous silica, as do the new filters developed by the inventor.

The manufacturer of these products did not produce non-carcinogenic products suitable for large commercial application, such as in refrigerated warehouses or freezer warehouses.

When the inventor learned that calcined amorphous silica (the previously used mineral) is classed as a carcinogen in California, he experimented with pure amorphous silica (natural diatomaceous earth) in the place of the calcined product. Pure amorphous silica is non-carcinogenic. He found that amorphous silica has superior qualities of adsorption, and replaced his existing passive filtration media with it.

The inventor originated and tested large bag filters of pure amorphous silica (not calcined diatomaceous earth), and discovered that it is more than twice as efficient at adsorbing water and pollutant molecules as the previously utilized material. It adsorbs 116% of its weight in water, compared to 53% for the previous material. Added to this, it is non-carcinogenic and certified for use in food preparation areas. These initial filters were intended to serve refrigerator or freezer warehouses. These filters contain approximately 2 kilograms of pure amorphous silica (non-calcined) powder (a much less dense powder than the calcined diatomaceous earth and marble dust mixture previously utilized) in an inner filter bag of polypropylene filtration material, surrounded by an outer bag of rough protective cloth, and having two steel grommets for hanging. See FIG. 1 (The first use of such large bag filters for the purpose of adsorbing indoor airborne particulates and pollutants occurred on 2009 Apr. 14. PPA 61/335,316 was filed by the inventor on 2010 Jan. 5).

These filters provide a greater quantity of amorphous silica for lowering humidity, eliminating odors and saving electricity. However, they have the following drawbacks:

They are sewn together, and cannot be opened to change outdated mineral or to allow the bag to be cleaned.

They have steel grommets for hanging. These grommets rust and lose strength in the wet environments we serve.

If a bag became soiled, it has to be discarded. This is wasteful and against the recycling ethos of our company.

These filters have only two layers: An outer protective bag which could not contain the fine amorphous silica dust if the inner bag were somehow punctured, and the inner filter bag. There were a number of instances in which the inner filter bag developed a slight puncture and lost a significant amount of mineral.

The fact that amorphous silica also directly attracts and adsorbs a wide variety of fungal spores, a wide variety of bacteria, a wide variety of pollens, hyphal fragments, insect fragments and feces, and a wide spectrum of other air particulates and pollutant gasses was not proven until the inventor conducted extensive experiments to prove these functions. This information itself is not patentable, but the application of the inventor's prior design (See FIG. 1) to this new purpose is patentable. Further, the new embodiments of temperature pump passive filters, filter coatings and automated devices using temperature pump passive filters, which are disclosed in this regular patent application, and which incorporate these functions in new and unobvious ways, are patentable.

The process underlying the humidity control function of the prior art products, the temperature pump cycle, was previously not understood as a general physical process which can be adapted to numerous embodiments for many different air filtering applications. The new, non-obvious, patentable embodiments described herein are all based on the temperature pump cycle.

Temperature pump cycle: This regular patent application applies to all the new designs of passive filtration devices shown herein using the concept of a "temperature pump cycle," which utilizes amorphous silica for passive fluid filtration in a gaseous environment. Within a temperature range specific to amorphous silica in air or other gasses, the mineral draws in water micro-droplets, including the particulates which serve as the nucleation agents for these droplets. These nucleation agents include a wide variety of mold and fungal spores, airborne bacterial spores, pollens, viruses and other small particulates which are allergens or disease vectors. In a lower temperature range, these particulates are adsorbed by the amorphous silica. At a higher temperature, starting at a point referred to as the transition temperature (about 26-27° C.), the particulates are dislodged from the amorphous silica by Brownian motion, and are desorbed into the surrounding gas. The temperature pump cycle is based on the aforesaid process, by which the amorphous silica adsorbs and desorbs small particulates as a function of temperature.

Temperature pump passive filters are designed to operate passively in the cool environments into which they are placed, to be withdrawn periodically, and to be placed in a warm, drying atmosphere (or warmed with microwaves) to allow ex-filtration of humidity, pollution particulates and gasses into a drying facility air space where humidity and pollution are not a concern. These extremely useful and surprisingly revolutionary passive air filters are discussed in the following section to allow the Patent Office to evaluate a number of the different new applications of such filters. Already within less than 12 months of first public use (starting Apr. 14, 2009), the inventor has created a viable business of indoor pollution control with a number of customers.

This regular patent application describes the following embodiments of patentable temperature pump passive filters which permit practical use of the temperature pump cycle as described above. Most of these involve a specially designed filter which functions in a low-temperature, air-conditioned or refrigerated environment, which is withdrawn from that environment to be placed in a higher-temperature drying environment to allow humidity and nucleation pollutants to escape from the filter. However, some of the temperature pump passive filters will serve such sensitive environments (such as hospital laboratories and electronic clean rooms) that they are designed as disposable filters, not to be recycled like the majority of the designs discussed below. In the case of temperature pump passive filters, the use of existing designs of air filters in refrigerators and freezers is not the patentable design, since the inventor and others have been using such filters for a number of years for the limited purposes of better preserving food in refrigerators, preventing mold, saving energy and preventing icing in freezers.

Rather, the first claim category herein involves the use of stationary temperature pump passive filters comprising pure amorphous silica and various filter structures as anti-pollution devices, for the adsorption of a wide variety of spores, bacteria, viruses, insect parts, hyphal parts, pollens, other allergens, radon gas, and other air pollutants, both gaseous and particulate. The embodiments which follow are only exemplary of this general claim, and should not be considered as limiting the claim to these designs alone.

The second claim category of temperature herein comprises coatings of building material surfaces or a matrix of fibers with amorphous silica and an odorless, non-polluting adhesive to permanently control humidity and prevent condensation of water in a closed volume of air, in which high humidity or water condensation is undesirable, and which coating operates naturally to release the stored water molecules at a time when the relative humidity is low. These coatings also adsorb the pollutants listed in the above paragraph, specifically adsorbing and sequestering mold and other fungal spores which have become an increasing concern in tightly constructed buildings. The embodiments which follow are only exemplary of this general claim, and should not be considered as limiting the claim to these designs alone.

The third claim category involves automated devices which use temperature pump passive filters comprising pure amorphous silica and various filter structures as anti-pollution devices, for the adsorption of a wide variety of spores, bacteria, viruses, insect parts, hyphal parts, pollens, other allergens, radon gas, and other air pollutants, both gaseous and particulate. The embodiments are the "temperature pump" and the "temperature pipe". The embodiments which follow are only exemplary of this general claim, and should not be considered as limiting the claim to these designs alone.

The problem with simply using amorphous silica as a passive filter material is obvious: Passive filters must be replaced when they become filled with pollutants. Using temperature pump passive filters for elimination of indoor air pollution assumes that these filters are changed out regularly, with the filters being thermally dried and allowed to discharge their pollutant loads to the atmosphere. The required change-out frequency ranges from one change-out every three months for light pollution loads (such as for household air conditioning applications), to change-outs once a week in heavy pollution applications (such as in a mushroom-growing facility choking with mushroom *basidiospores* and various fungal pest spores such as *aspergillus, penicillium* and *verticillium*). The requirement for filter change-out makes the use of temperature pump passive filters non-economic in some applications. This demands that automated designs for the use of amorphous silica's unique adsorption of excess humidity and air pollutants be developed to complement the many uses of stationary filters. This regular patent application presents patentable embodiments of temperature pump passive filters which require periodic change-out, as well as permanent adsorptive coatings of building materials for some functions, and embodiments of the temperature pump cycle that are automated, and thus do not require frequent filter change-out.

As regards the automated devices disclosed in Embodiments #21 through #27, the inventor's patent search has not revealed existing applications of amorphous silica automated temperature pumping devices (including the temperature pump and temperature pipe embodiments shown herein), other than his own. Automated temperature pumping device embodiments disclosed herein have not yet been used publicly by the inventor. The inventor has used temperature pump passive filters for the purpose of eliminating indoor air pollution for less than one year, and has made a successful business of doing so, but automated equipment for using amorphous silica's many positive characteristics for all purposes is clearly needed.

As briefly described above, the automated temperature pumping device embodiments fall into two categories, disclosed herein:

The temperature pump is a device which requires active heating of the filter body and concomitant release of pollutants into the atmosphere.

The temperature pipe embodiment may be totally passive, using solar heating of the pipe to accomplish cleansing of indoor air, or may be assisted by an active heating device. The temperature pipe may allow a small amount of indoor air to escape by flowing through the mineral powder, but since the filter in this embodiment completely blocks the pipe, and extends a good way up the pipe, very little air is lost.

Both of these major types of automated temperature pumping device embodiments are capable of cleansing indoor air to a much cleaner state than the outside air. Even after review of the "tank" discussion above, this fact may not seem obvious, since the temperature pump passive filters used in the temperature pump embodiments, and the filters used in the temperature pipe embodiments would initially appear to be mere conduits for osmosis of indoor pollutants to the outside air. If this were the case, the indoor air could only be cleaned to the often very polluted level of outdoor air, since no osmotic pressure would exist to allow more indoor pollutants to escape if simple osmosis were occurring. The key to amorphous silica's ability to cleanse indoor air to very pure states is that when the amorphous silica is raised above the above transition temperature, increased Brownian motion cleanses the mineral to a quite clean state, almost entirely free of all pollutants. Thus, gaseous and particulate pollutants are discharged from the heated mineral, even into outdoor air which is more polluted than the indoor air from which the pollutants were drawn. This requires a net input of energy, and the process is driven by the heat source which heats the mineral and increases the Brownian motion of the pollutants to discharge them, cleansing the filter.

APPLICATIONS

The applications of the automated filters discussed in this regular patent application are so extensive that they cannot be adequately addressed herein. The temperature pump should be required in every refrigerator and freezer (household or industrial) produced. Its ability to: lower temperature at the same thermostat setting; eliminate wetness in walk-in refrigerators, reduce ethylene gas to zero in an enclosed space; eliminate odor contamination; extend the storage life of stored fruits and vegetables by up to 300%; eliminate mold, funguses and airborne bacteria from refrigerated spaces; allow storage of open dry foods such as potato chips, tortilla chips and nuts without contamination for extremely long periods; reduce compressor running time by up to 50%; save refrigerator and freezer electric power by up to 40-45%; prevent icing; eliminate wasteful defrost cycles in freezers by at least 75%; decrease chill time by up to 50% (also helping to prevent bacterial infection in an industrial context); enable longer storage in case of power outages; and prevent "freezer burn" (bacterial odor contamination) of food, all mean that the temperature pump should be a mandatory part of the design of every refrigerator and freezer system in the world.

Refrigeration-related design applications for automated temperature pumping devices only scratch the surface. Room temperature storage of perishables is possible for much longer periods of time if airborne bacteria, molds and fungi are eliminated as threats to the food. This means that solar-powered temperature pumps or solar-powered temperature pipes could in many cases remove the need for refrigeration entirely. Because ground temperatures around the world tend to be 26° C. or less, less developed countries could use buried or partially-buried food storage areas with inexpensive solar-powered temperature pump/temperature pipe technology to preserve food without refrigeration or grid power.

Because of their ability to adsorb bacteria, molds, pollens, insect parts, cat dander, dust, dust mites, and (by extension from present research results) even smaller micro-droplet nucleation agents such as small hydrocarbons, viruses and prions, temperature pump/temperature pipe devices should be the standard of care for cleansing the air in every hospital, nursing home, and outpatient medical care facility. Diseases caused by airborne (sporing) bacteria include botulism (*Clostridium botulinum*), gas gangrene (*Clostridium perfringens*), tetanus (*Clostridium tetani*), acute food poisoning (again, *Clostridium perfringens*), anthrax (*Bacillus anthracis*), two other types of food poisoning (both caused by *Bacillus cereus*), and non-sporing, but nonetheless airborne, tuberculosis (*Mycobacterium tuberculosis*), among many others. Placing this technology in all medical facilities is a must to help eliminate transmission of disease from infected patients to others.

The above effects could be extended to every residential and office building HVAC system. While exposure to disease vectors in the open air may be beneficial to developing immune systems for children, many individuals throughout the world would choose to place automated, full-spectrum filtration systems which require either no power (or very little power) in their homes and offices. Temperature pump and temperature pipe filters also require either no change-out or infrequent change-out (the limits are not yet established), unlike the ubiquitous HEPA filters today. Paper HEPA filters are also much more limited in being able to filter out the smallest particulates, since they must allow air to be blown through them. The temperature pump and temperature pipe embodiments passively attract even the smallest pollutants, then upon heating allow them to be released to the outside air.

Serious bacterial diseases may be less of a threat to people with extreme allergies than the allergens that bedevil them. Our research has already shown that temperature pump passive filters eliminate molds, fungal spores and especially insect parts from the air. Boston University Medical School researchers have shown that airborne insect parts, specifically those from German cockroaches, may be implicated in a majority of the serious cases of asthma in the United States.

Child-care facilities can eliminate diaper odors by using temperature pump passive filters (or temperature pumps), as proven by one of inventor's customers since mid-2009. Bathrooms can be deodorized with no chemical cover-up or expensive air exhaust systems, by using an automated temperature pumping device. Temperature pumps and temperature pipes also increase the Comfort Index in air-conditioned spaces by decreasing humidity.

Electronic fabrication facilities ("FABs") have an ever-increasing need for cleaner air. The multi-stage filtration systems they presently use could be greatly improved using the automated temperature pumping devices disclosed herein. Passive filtration does not disturb the air, while at the same time allowing the very smallest particulates to be adsorbed.

For much of the United States, radioactive and carcinogenic radon gas is a concern, especially in basements. A cool basement is an ideal environment for placement of automated temperature pumping devices. Because radon is a nuisance gas which accumulates gradually (such as ethylene gas does in a refrigerator containing fruits and vegetables) it will be adsorbed in the same way as we have proven ethylene gas to be adsorbed, and discharged with little or no loss of heated or cooled air. This will absolutely minimize both the installation cost and the electrical expense of radon treatment systems.

Chinese sheet rock (and some sheet rock produced in the United States) has been implicated in causing elevated levels of hydrogen sulfide ($H_2S$) in thousands of homes. Impurities such as iron disulfide, sulfur dioxide and hydrogen sulfide in the sheet rock can pose a health threat, even in low concentrations. Installation of automated temperature pumping devices in affected homes could eliminate this threat without the expense of major reconstruction.

Temperature pump technology should provide a superior gas mask to eliminate poison gasses from the air troops breathe on a continuous basis. Current gas masks are limited in the amount of time they can absorb poison gas, but a two-barreled temperature pump gas mask could allow one temperature pump to be adsorbing poison gas and providing the soldier with clean air, while the other temperature pump is heating and desorbing the poisonous molecules into the already contaminated air.

Other pollutant gas removal systems can be envisioned. Methane is over 20 times as strong a thermal-trapping gas as carbon dioxide in the atmosphere. Methane adsorption systems using automated temperature pumping technology could decrease the threat of methane pollution from landfills and animal feed lots.

Mold remediation and flood damage mitigation can be simplified using the temperature pumps or temperature pipes shown herein. The inventor had a flooded room in his house in 2009, and effectively used temperature pump passive filters to quickly eliminate all objectionable odors from the flooding. An automated temperature pump or temperature pipe would be even more effective at drying the room and constantly removing mold spores, other fungal spores, bacteria; mold smells and other odors resulting from flood damage.

Automated temperature pumping devices can be used for corrosion control, especially in outdoor equipment installations, such as traffic lights, electrical switching equipment and cable network boxes. In humid environments, the use of unpowered temperature pipes (operating due to the normal diurnal temperature variation in the equipment enclosure) or solar-powered temperature pipes could help eliminate excess humidity in the equipment enclosures, avoiding large expenditures for equipment replacement due to oxidation.

Bats and bees have something in common: They are being attacked by very destructive funguses. Millions of bats have died in the last few years from the White Nose Syndrome, a fungal disease. Permanent temperature pipe installations in bat habitats could help deal with this problem, which has been called "one of the most precipitous declines of wildlife in America." Honey bees are currently being decimated by a number of fungal and viral diseases. Solar-powered temperature pipes for beehives could well help address and defeat these disease vectors, which directly threaten crop pollination for farmers nationwide.

Several temperature pump and temperature pipe embodiments are discussed in more detail in the following DRAWINGS and DETAILED DESCRIPTION OF EMBODIMENTS sections. These embodiments need to be modified only slightly to apply to the wide-ranging applications disclosed above.

DRAWINGS

Figures

FIG. 1 shows diagrams of Embodiment #1, inventor's large temperature pump passive filter for indoor air pollution control.

FIG. 1*a* shows the front view of the temperature pump passive filter

FIG. 1*b* shows the side view of the temperature pump passive filter

FIG. 4 shows the inner design of large, improved general purpose temperature pump passive filter Embodiment #2.

FIG. 4*a* shows the first inner filter

FIG. 4b shows the first inner filter (loaded with amorphous silica) being inserted into the second, identical inner filter.

FIG. 4c shows the double-walled inner filter

Figure 5:
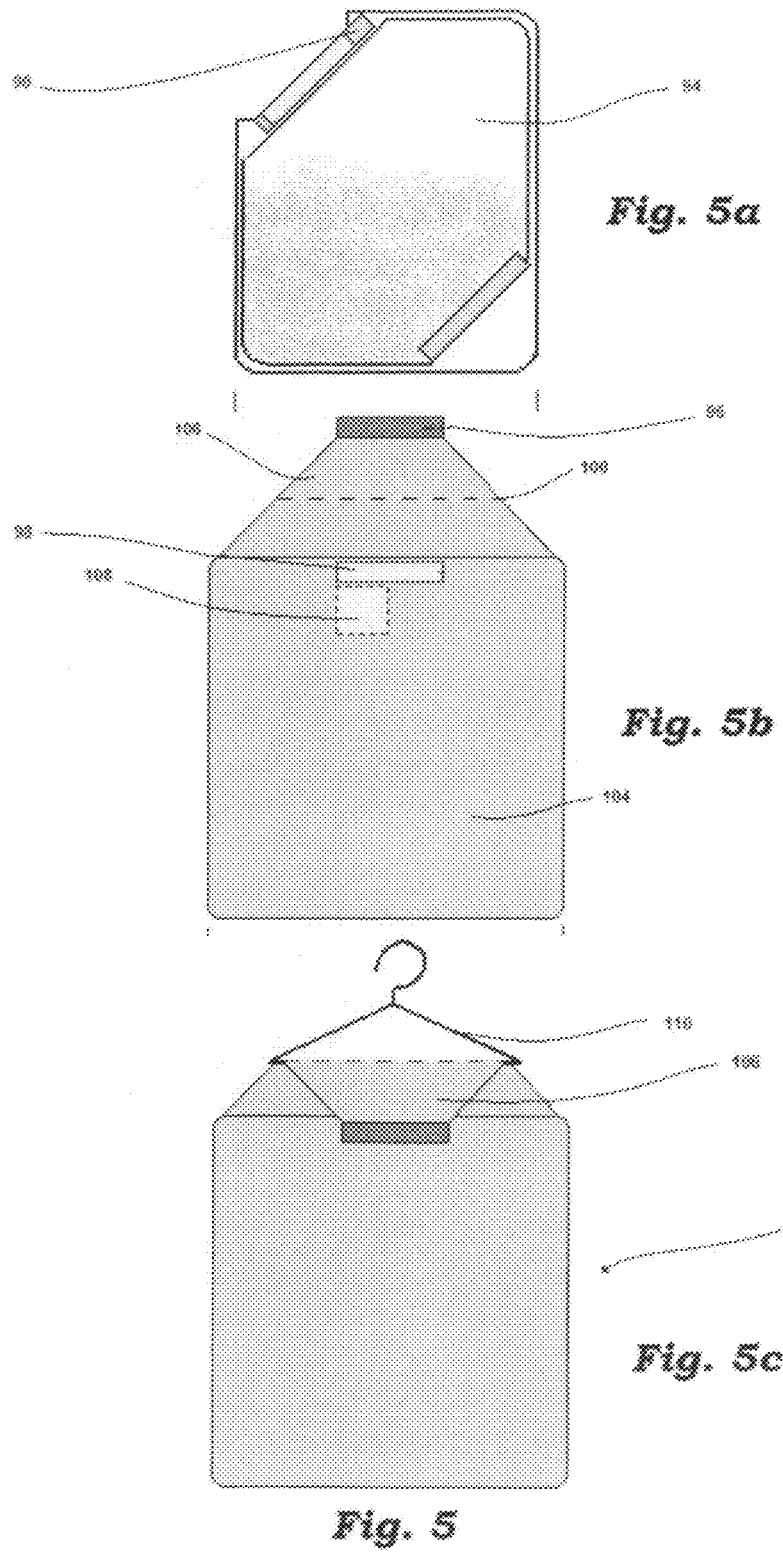

FIG. 5 shows the outer container construction of improved general purpose temperature pump passive filter Embodiment #2.

FIG. 5a shows the double-walled inner filter

Figure 6:
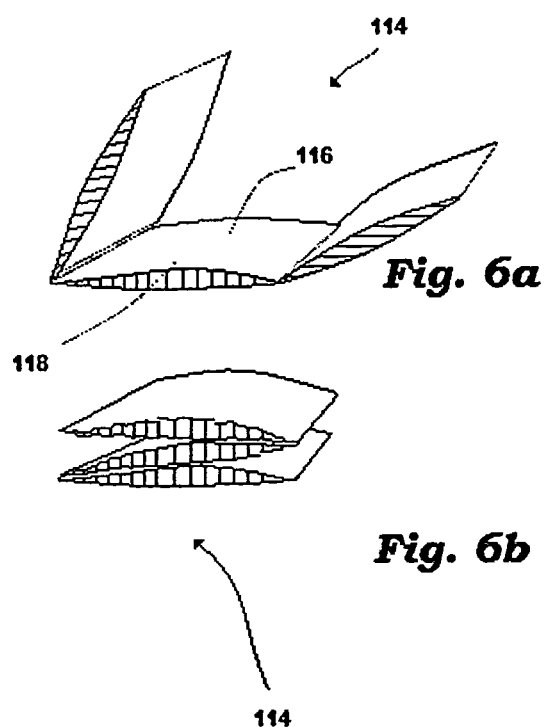

FIG. 5b shows the outer container into which the double-walled inner filter is inserted FIG. 5c shows the completed filter assembly attached to the hanger FIG. 6 shows Embodiment #3—suitcase and hotel room freshener.

Figure 7:
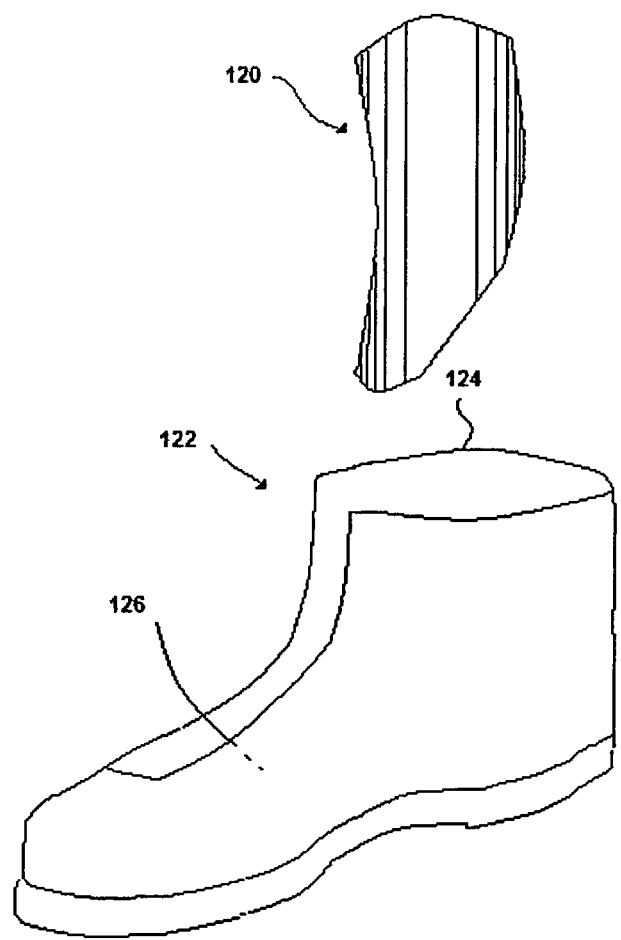

FIG. 7 shows Embodiment #4—anti-fungal filter for shoes.

Figure 8:
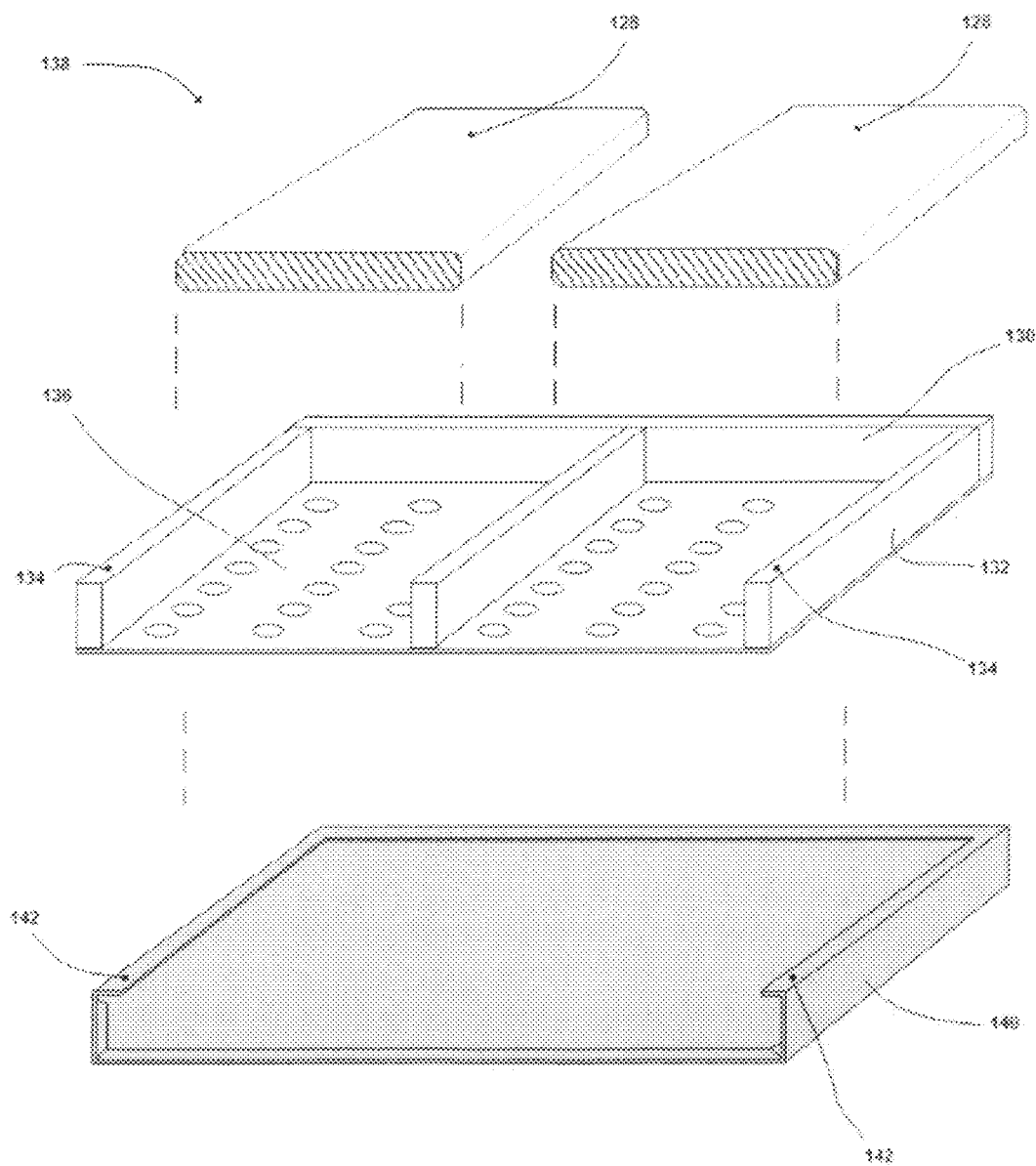

FIG. 8 shows Embodiment #5—wall-mounted room air filter.

Figure 9A:
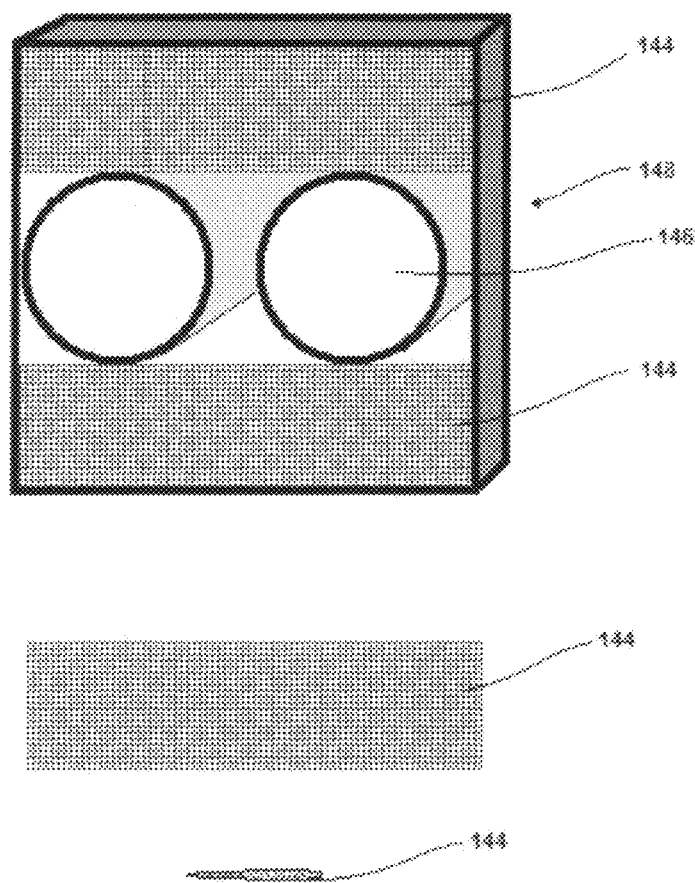

FIG. 9a shows Embodiment #6—straight ceiling warm air return vent filter.

Figure 9B:
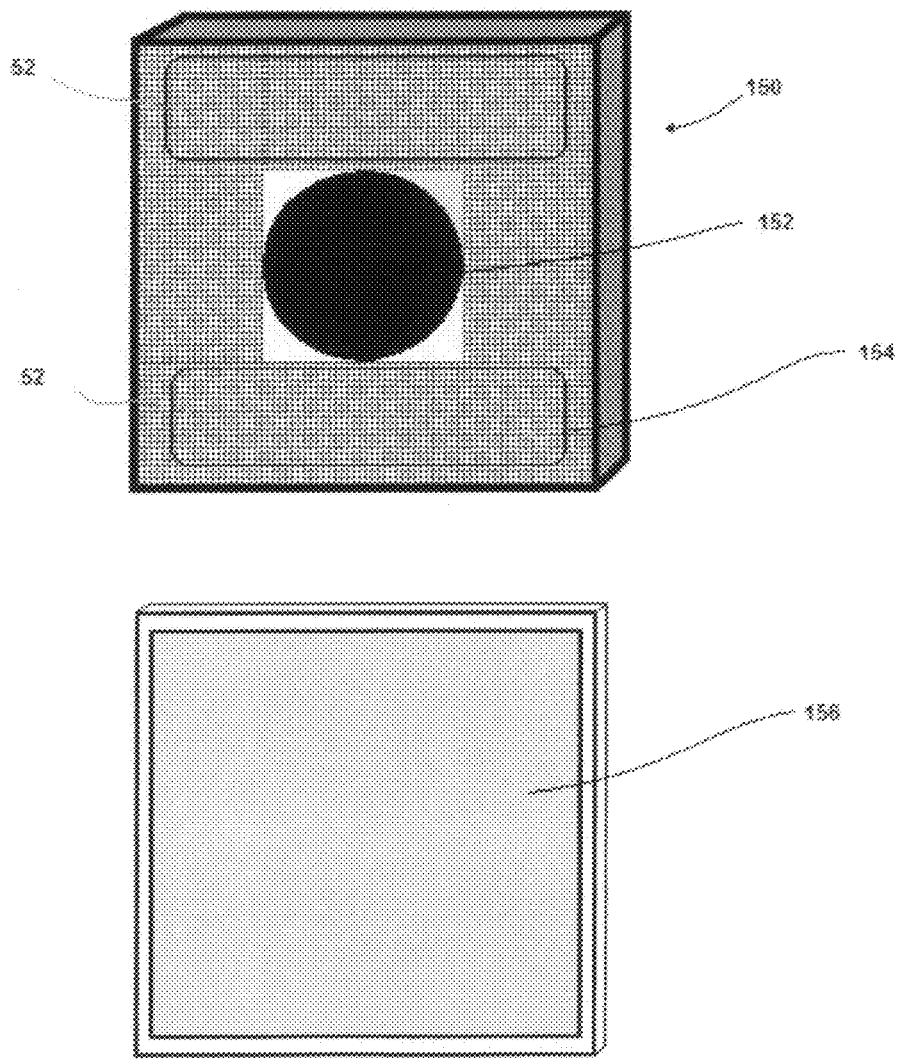

FIG. 9b shows Embodiment #7—harness ceiling warm air return vent filter

Figure 10:
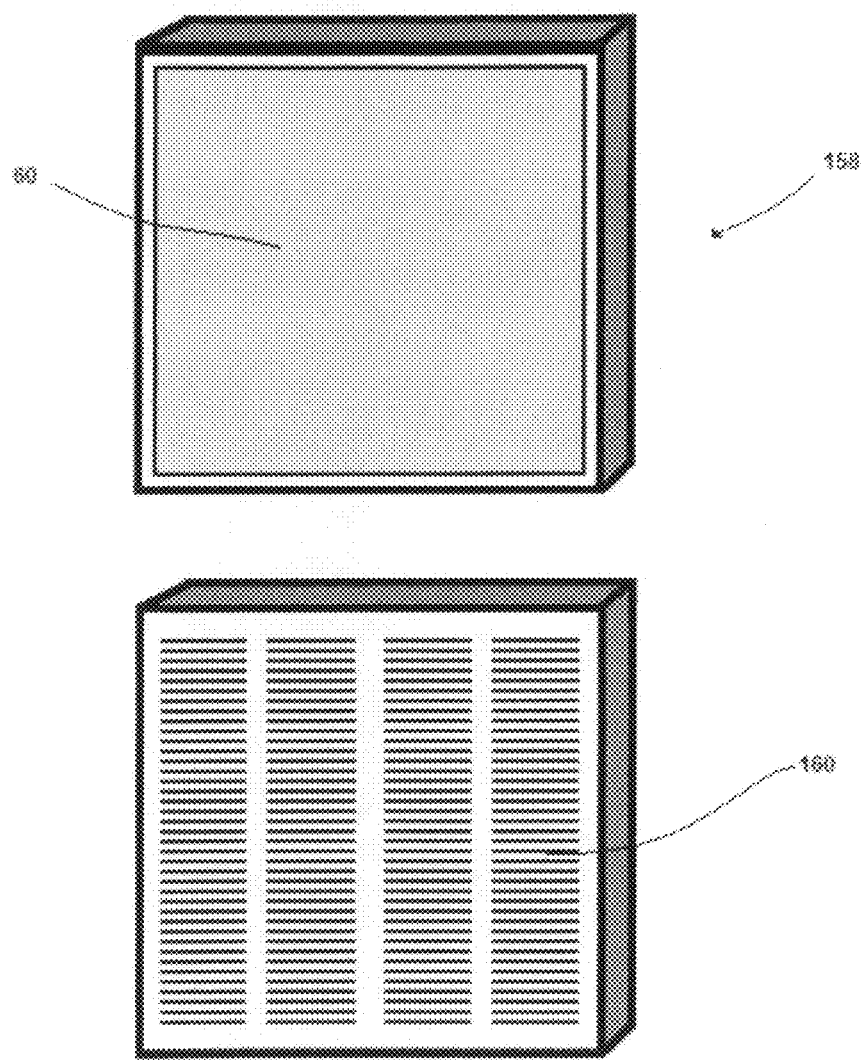

FIG. 10 shows the entire ceiling warm air vent assembly housing either Embodiment #6 or Embodiment #7

FIG. 11 shows Embodiment #8—sleeping bag anti-mold storage filter

Figure 12:
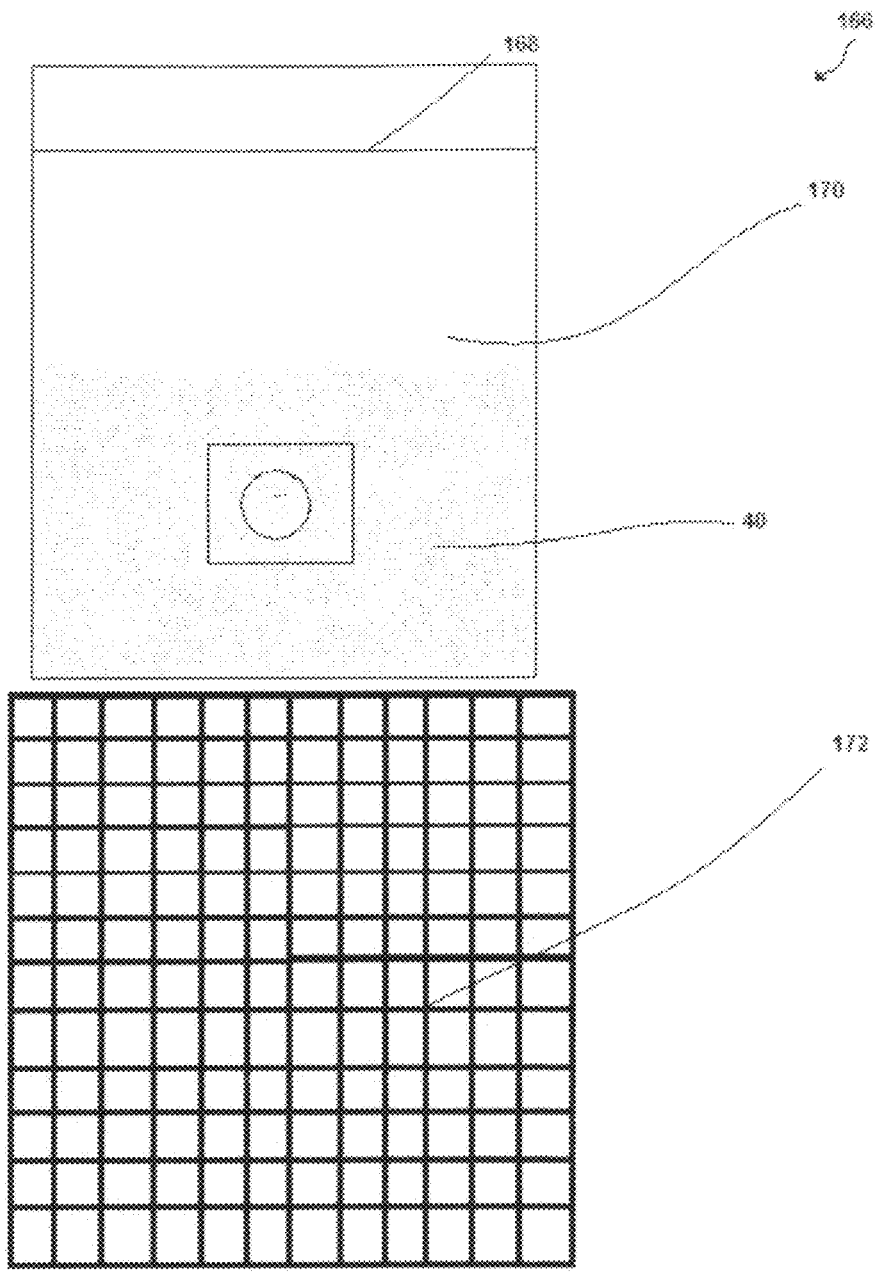

FIG. 12 shows Embodiment #9—disposable temperature pump passive filter

Figure 13:
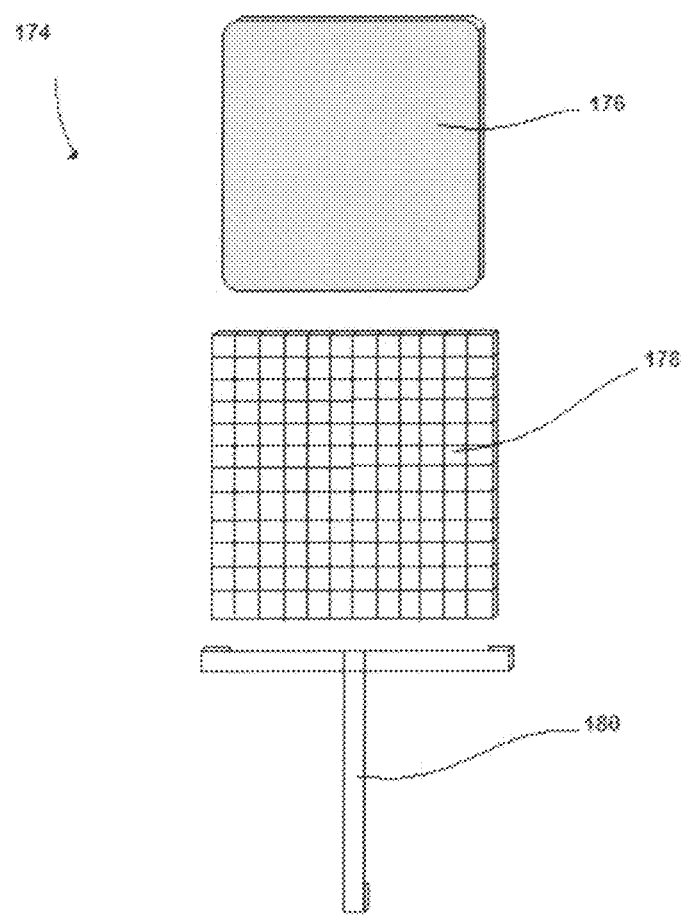

FIG. 13 shows Embodiment #10—hotel room passive air filter

Figure 14:
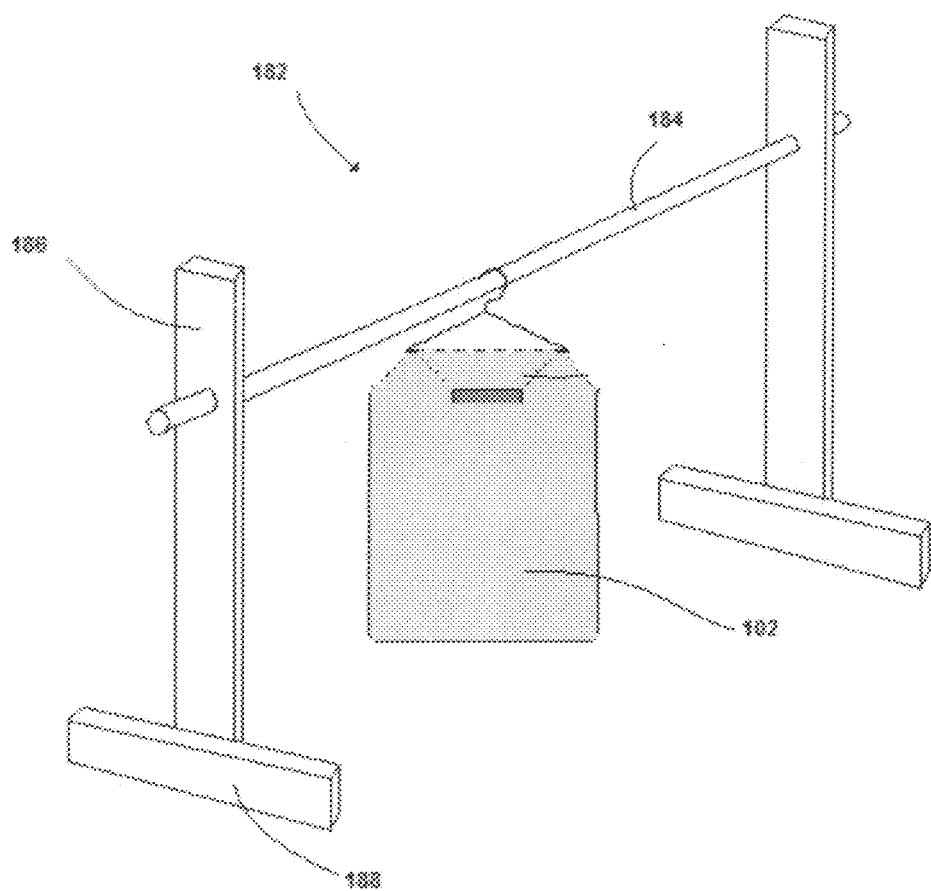

FIG. 14 shows Embodiment #11—flood damage mitigation assembly, with new general purpose temperature pump passive filter.

Figure 15:
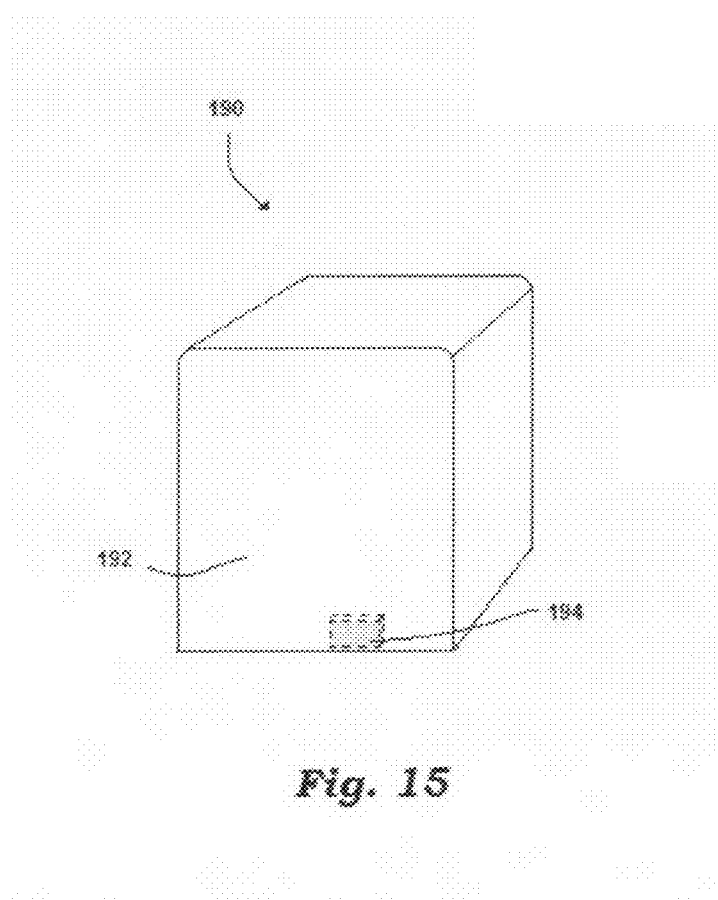

FIG. 15 shows Embodiment #12—corrosion control filter.

Figure 16:
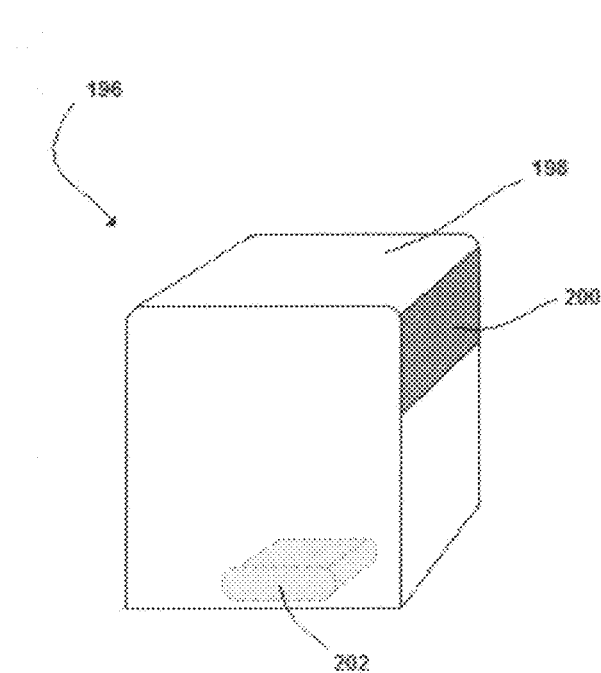

FIG. 16 shows Embodiment #13—bee hive virus/fungus control filter.

Figure 17:
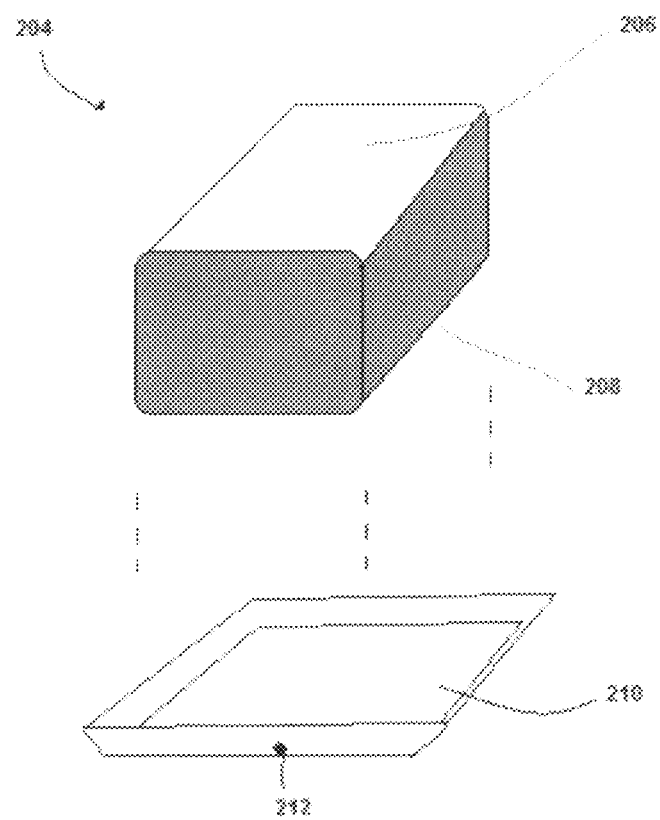

FIG. 17 shows Embodiment #14—bat cave fungus control filter.

Figure 18:
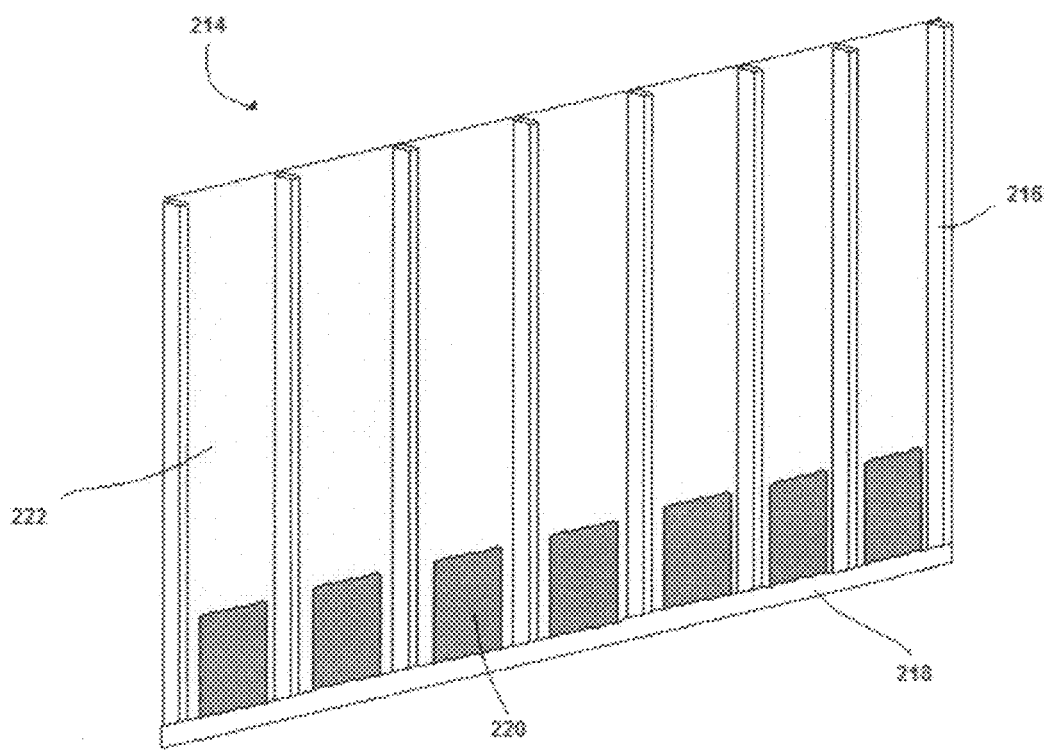
Figure 19:
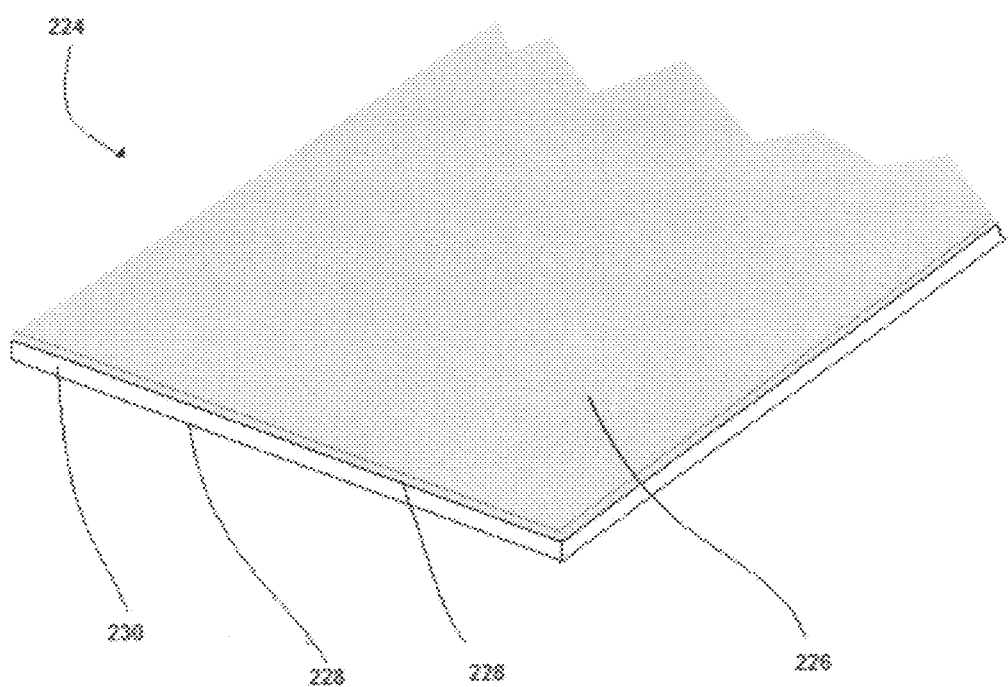

FIG. 18 shows Embodiment #15—in-wall filters to eliminate wall condensation and mold FIG. 19 shows Embodiment #16—coating for drywall to eliminate wall condensation and mold.

Figure 20:
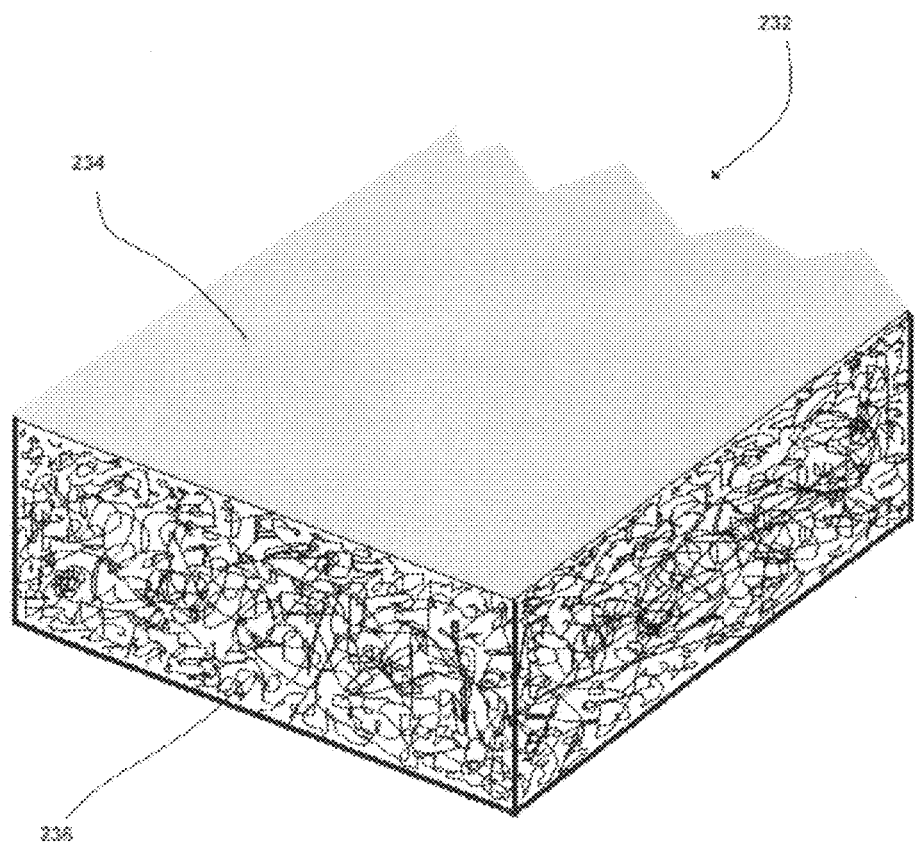

FIG. 20 shows Embodiment #17—mineral matrix filters.

Figure 21:
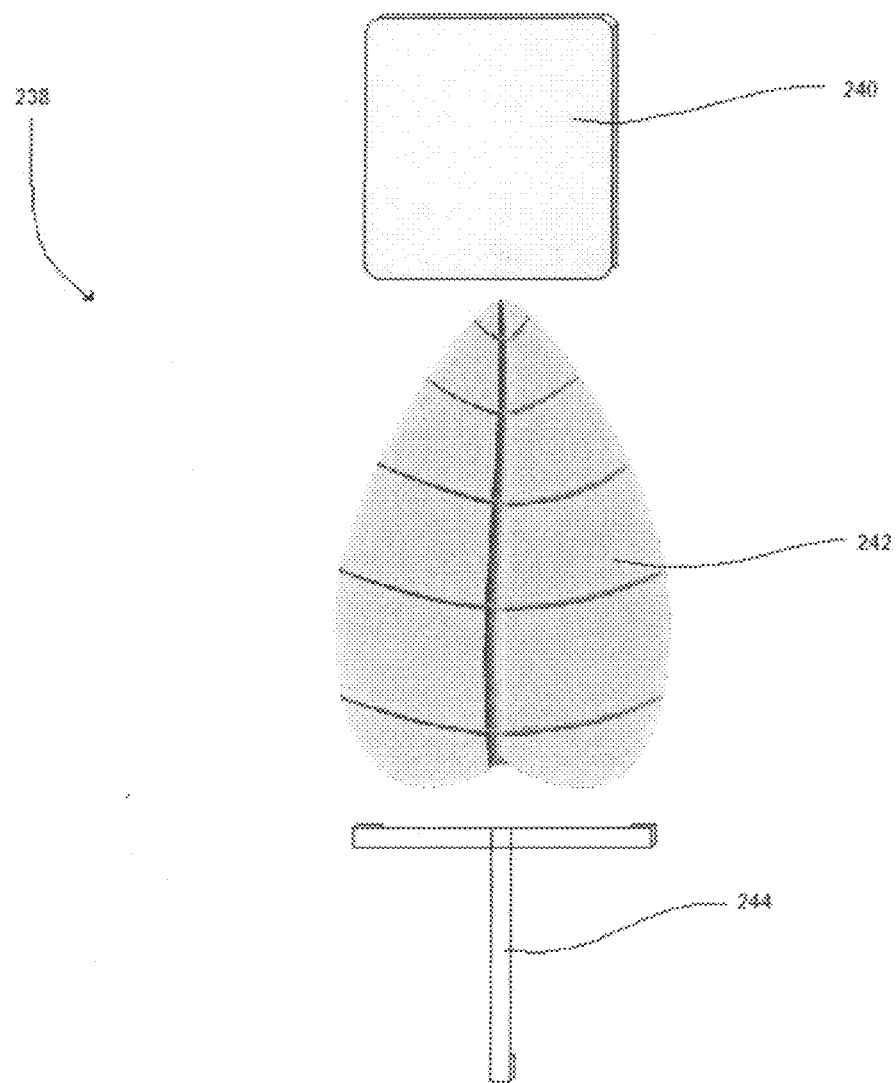

FIG. 21 shows Embodiment #18—bathroom filter.

Figure 22:
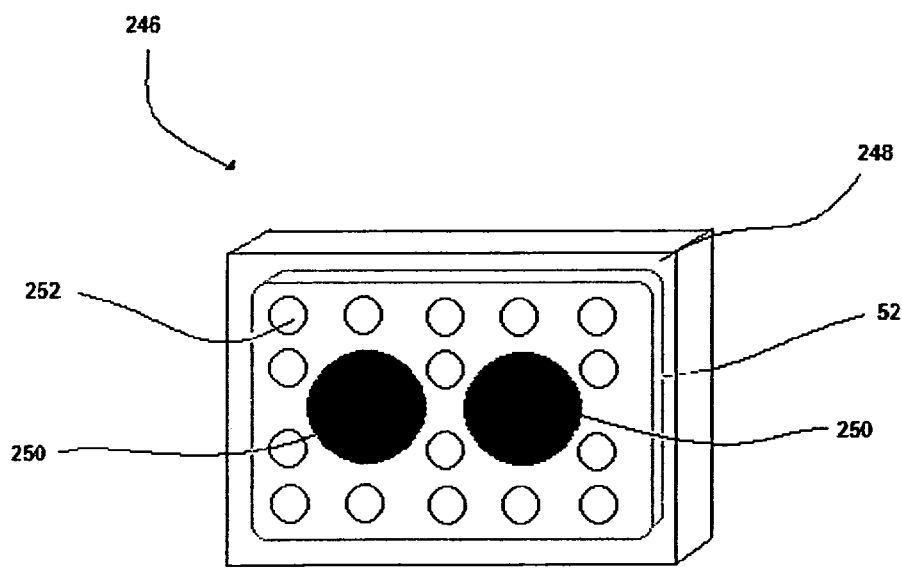

FIG. 22 shows Embodiment #19—automobile odor and air pollution filter.

Figure 23:
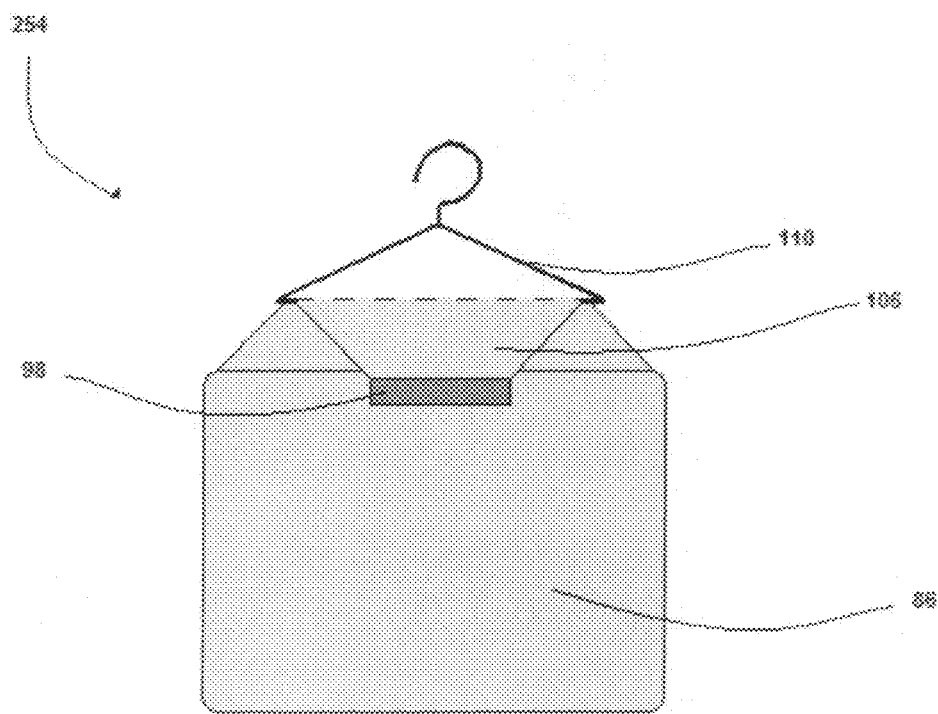

FIG. 23 shows Embodiment #20—closet freshener.

FIG. 24 provides two environmental, cross-sectional views of Embodiment #21—temperature pump.

FIG. 24a shows Embodiment #21 temperature pump in the open inlet/closed outlet configuration.

FIG. 24b shows Embodiment #21 temperature pump in the closed inlet/open outlet configuration.

Figure 25:
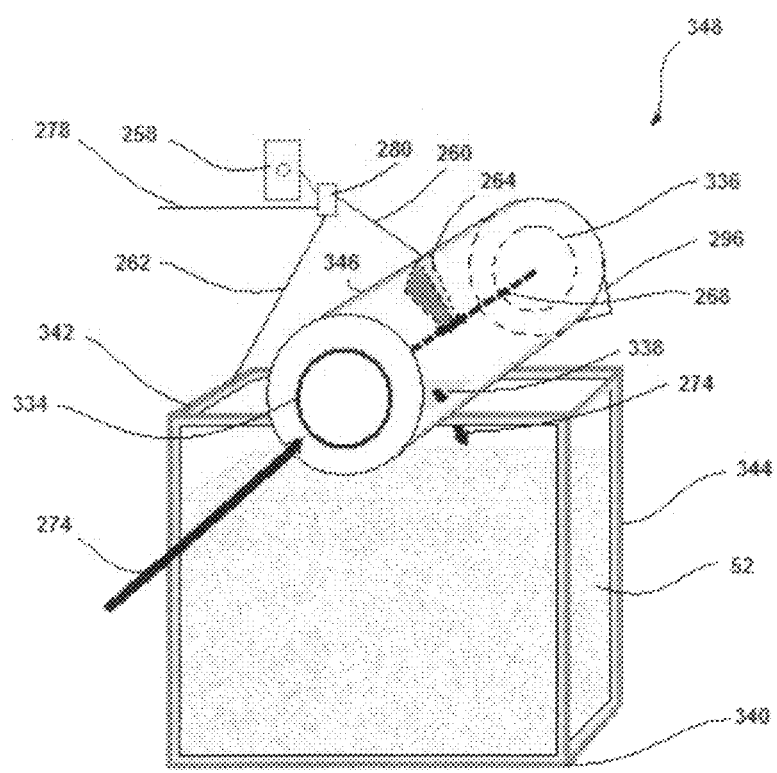

FIG. 25 shows an environmental, cross-sectional view of Embodiment #22—large plenum temperature pump. The figure shows a cylindrical temperature pump vent with circular intake plug and circular, top-hinged outlet vent, attached to a plenum containing a large amount of amorphous silica to serve large indoor areas. This view shows the temperature pump in the adsorption mode, with the intake open and outlet closed.

Figure 26:
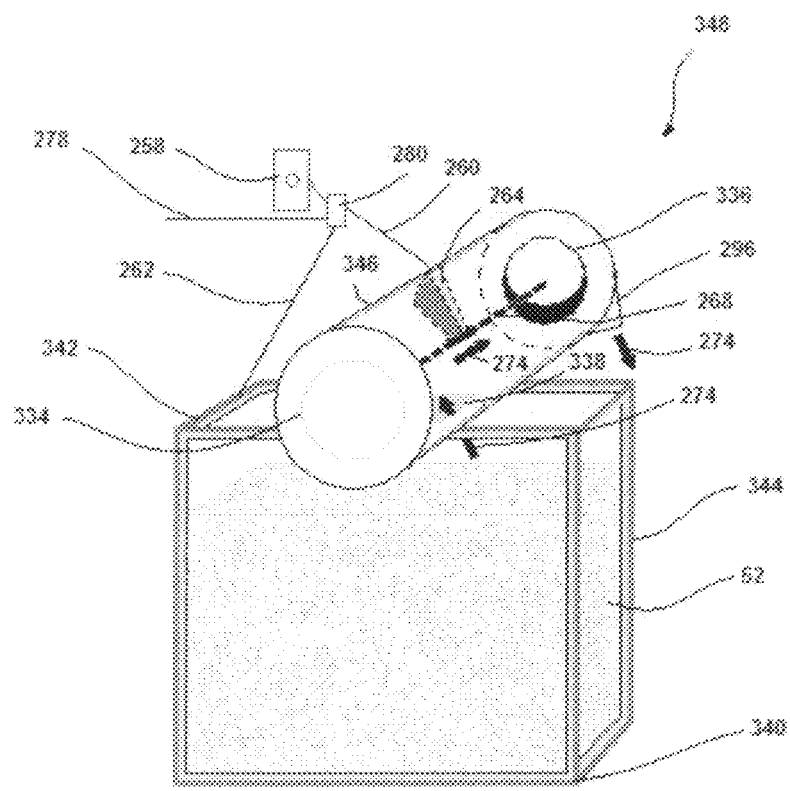

FIG. 26 shows an environmental, cross-sectional view of Embodiment #22—Large plenum temperature pump in the desorption mode. The temperature of the amorphous silica filter is raised by the heat source to a temperature higher than the transition temperature. Thus, gaseous and particulate pollutants are being released to escape from the temperature pump outlet into the outside air.

FIG. 27 shows environmental, perspective and cross-sectional views of Embodiment #23—window-mounted temperature pipe. This view shows the continuous flow of pollutants up the pipe, due to the attractive action of the amorphous silica for pollutants at room temperature, and the upward release of pollutants as the upper part of the pipe and filter are warmed.

FIG. 27a shows the outdoor view of Embodiment #23—window-mounted temperature pipe.

FIG. 27b shows the indoor view of Embodiment #23—window-mounted temperature pipe.

FIG. 27c shows a cross-sectional view of Embodiment #23—window-mounted temperature pipe embodiment.

FIG. 28 provides environmental, cross-sectional views of Embodiment #24—Wall-mounted temperature pipe, and Embodiment #25—roof-mounted temperature pipe.

FIG. 28a shows the design of Embodiment #24—wall-mounted temperature pipe, with the inlet located a short distance above the floor level, and with the vertical portion of the temperature pipe rising to allow sunlight to warm the upper part of the pipe, which has a rain cover to keep the amorphous silica filter dry.

FIG. 28b shows Embodiment #25—roof-mounted temperature pipe. Both Embodiments #24 and #25 have the amorphous silica filter completely blocking the air flow to largely prevent the loss of conditioned air.

Figure 29:
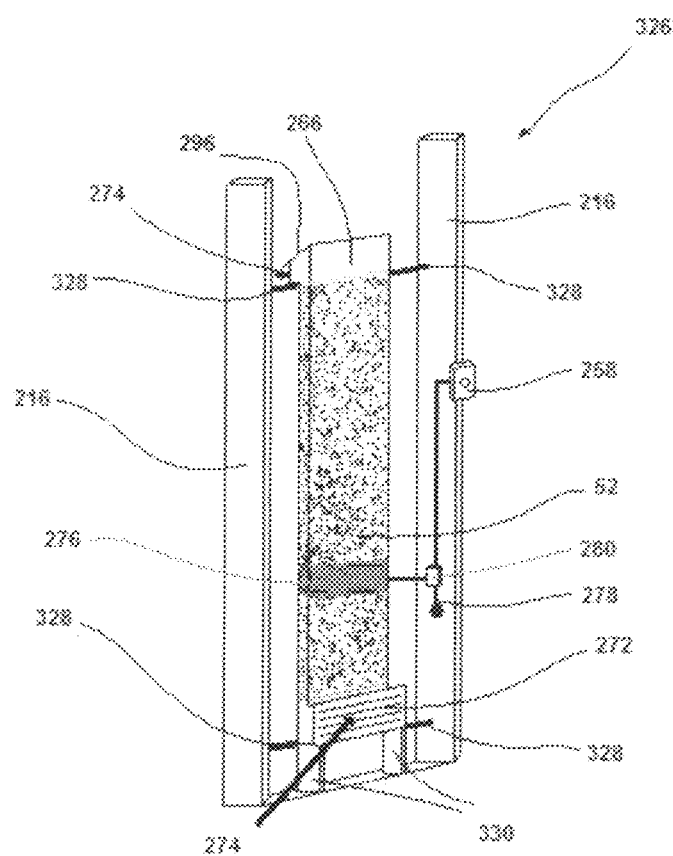

FIG. 29 provides an environmental, perspective view of Embodiment #26—in-wall temperature pipe for cleansing the air in indoor spaces.

Figure 30:
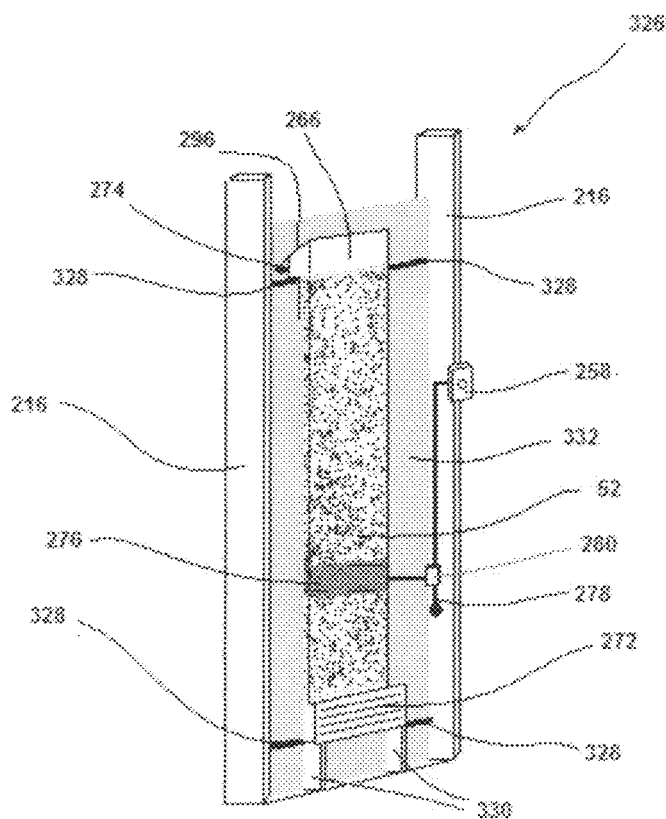

FIG. 30 shows the arrangement of insulation required for Embodiment #26—in-wall temperature pipe.

FIG. 31 shows Embodiment #27—air conditioning temperature pipe located on the warm air return of an air conditioner air handling unit located in a warm attic. This design uses the warm/hot air in the attic, or the outside air, as a heat source driving the temperature pump cycle to remove pollution from the cool re-circulated air.

FIG. 31a shows an overall view of the air conditioner air handling unit and Embodiment #27, air conditioning temperature pipe.

FIG. 31b shows a detailed view of Embodiment #27, air conditioning temperature pipe.

FIG. 31c shows a detailed view of the backflow prevention valve of Embodiment #27, air conditioning temperature pipe.

DRAWINGS

Reference Numerals 40 amorphous silica powder
42 outer protective container
44 inner filter container
46 stainless steel compression grommet
48 sturdy horizontal seam
50 thick strength panel
52 temperature pump passive filter
54 vertical seam
56 backflow prevention valve
58 hinge
60 two-rail drying rack
62 flapper valve plate
64 typical air conditioner air handling unit
66 cooled air flow
68 cooling coil
70 blow-through filter
72 fan assembly
74 warm air flow 76 warm air vent
78 filter assembly
80 add-on vent housing
82 two-rail track
84 housing access door
86 inner filter
88 hook strip
90 loop strip
92 rolled-up inner filter 86
94 double-walled temperature pump passive filter inner body
96 outer hook strap
98 outer loop strap
100 crease
102 improved general purpose temperature pump passive filter assembly
104 outer enclosure
106 upper flap
108 interior hook and loop pad
110 hanger
112 axle and weak resistance spring
114 suitcase filter
116 section of suitcase filter
118 backside of filter
120 shoe filter
122 shoe
124 top of shoe
126 filter position
128 small temperature pump passive filter
130 bottom plate of case
132 side of case
134 means of attachment to wall
136 pegboard perforated material
138 wall-mounted filter
140 cloth
142 mounting holes in cloth
144 straight filter
146 vent pipe
148 two vent ceiling warm air return
150 one vent ceiling warm air return
152 large single vent
154 harness filter
156 normal HEPA paper filter
158 warm air return housing
160 warm air return door
162 section of sleeping bag filter
164 sleeping bag anti-mold storage filter
166 disposable temperature pump passive filter
168 means of sealing
170 vacuum cleaner bag
172 plastic mesh holder
174 hotel filter assembly
176 hotel temperature pump passive filter
178 plastic mesh
180 hotel bracket
182 mold mitigation assembly
184 pipe
186 concrete board vertical members
188 concrete board horizontal members
190 outside electrical or mechanical equipment
192 outer cabinet
194 small anti-corrosion filter
196 bee hive
198 hive container
200 accessibility opening
202 beehive temperature pump passive filter (bottom coated with plastic)
204 bat cave temperature pump passive filter
206 plastic cover adhered to filter
208 large amorphous silica filter
210 plastic drain pan
212 drain hole
214 wall partition
216 riser
218 base plate
220 in-wall temperature pump passive filters
222 exterior insulation material
224 amorphous-silica coated sheet rock wall board
226 bonded coat of amorphous silica (faces the outside insulation)
228 paper layer
230 gypsum layer
232 open matrix temperature pump passive filter
234 filter paper coating
236 plastic or fiber glass matrix
238 bathroom temperature pump passive filter assembly
240 bathroom filter bag
242 changeable architecturally attractive face
244 T-bracket
246 automobile odor and air pollution filter
248 plasticized cardboard or plastic container
250 suction cup
252 holes
254 closet freshener
256 opening to body of temperature pipe 167
258 timer/on/off switch
260 power wire to motor/actuator
262 power wire to heat source
264 motor/actuator
266 outer vent
268 vent axle
272 inner vent
274 flow of excess humidity, odors, and gaseous and particulate pollutants
276 heat source
278 wall current source
280 junction box
282 temperature pump
284 window frame
286 window pane
288 top ledge
290 gap between inlet of temperature pipe and passive air filter
292 outer portion of passive air filter
294 window-mounted temperature pipe
296 angled rain/snow cover
298 exhaust slot
300 wall
302 front cover
304 cover handle
306 latch
310 wall-mounted temperature pipe
312 protective rain/snow cap
314 intake
316 upper portion of temperature pipe
318 dull black paint
320 floor
322 Roof-mounted temperature pipe
324 filter enclosure of melt-blown filter cloth
326 In-wall temperature pipe
328 support
330 floor support
332 wall insulation
334 circular vent plug to indoor air 336 circular, hinged vent to outside air
338 opening to filter plenum
340 filter plenum
342 heating jacket surrounding filter plenum
344 insulation surrounding heating jacket and filter plenum
346 cylindrical vent pipe
348 large plenum temperature pump
350 air conditioning temperature pipe
352 conditioned air vent
354 air conditioner air handler unit
356 inlet to air conditioning temperature pipe (hole cut in warm air return vent board)
358 vent to attic or outside air
360 body of temperature pipe, containing amorphous silica filtration bag
362 rectangular base of temperature pipe
364 air flow (return air)
366 warm air return vent
368 air flow (conditioned air)
370 expanded view, air conditioning temperature pipe
372 insulation to help keep amorphous silica below transition temperature
374 flow of pollutants into vented attic or air handler room (and thence into open air)
376 vent cap
378 flow of pollutants from warm air return vent air to filter, then to filter vent 358
380 backflow prevention valve
382 opening to body of temperature pipe 360

DETAILED DESCRIPTION OF EMBODIMENTS

Some of the objects and advantages of the present temperature pump passive filter embodiments having been stated, others will appear when considered in conjunction with the accompanying drawings, which present schematic representations of new filters, new filter coatings and new automated apparatuses designed for the elimination of indoor air pollution.

Embodiment #1

Existing Temperature Pump Passive Filter (in Public Use as Anti-Pollution Device Since 2009 Apr. 14: PPA 61/335,316 Filed 2010 Jan. 5)

Referring to FIG. 1*a*, there is shown temperature pump passive filter 52 constructed in accordance with the present embodiments. More particularly, temperature pump passive filter 52, which is adapted to remove gaseous and particulate matter (e.g. water molecules, ethylene gas, pectin gas, acid molecules, and nucleating particulates such as mold spores, bacterial spores, allergens, and other small particulates) from the air in which it is located, includes a double-walled container with the melt blown polypropylene cloth of the inner filter container 44 and the rough, porous cloth of the outer protective container 42 both folded over into a thick strength panel 50, and sewn with a sturdy seam 48 to complete temperature pump passive filter 52.

Inner filter compartment 44 is designed so that its walls contain 10-12 micron diameter amorphous silica particles, and so the powder it contains does not all sag to the bottom of filter 52. In this embodiment, a vertical seam 54 is taken in the inner filter compartment, so that two compartments are formed, preventing sagging of the powder so much as possible, so that the temperature pump passive filters retain a thin profile, and may be closely overlapped when mounted on a wall. This slim profile maximizes the amount of amorphous silica directly next to the door frame, where it is the most effective in drawing humidity (and accompanying nucleation particulates) into the powder. The thick strength panel 50 is penetrated by two stainless steel compression grommets 46, to allow hanging on one or two wall screws for support. The thick strength panel provides the requisite mechanical strength to support temperature pump passive filter 52 when the amorphous silica adsorbs a good deal of humidity, which in a freezer becomes ice, and makes filter 52 much heavier.

Referring to FIG. 1*b*, side view of temperature pump passive filter 52, the grommets 46 are sized so that they fit loosely over the collar of a number 8, ¾" hex head self-drilling screw. This means that filter 52 is restrained in place by the collar of the screw, but can easily be lifted off the screw (or screws) for removal and replacement with a filter 52 that has been reprocessed.

The construction of temperature pump passive filters 52 is such that they may be hung from a single screw and overlapped to concentrate as much of the amorphous silica as close to the door of the freezer, refrigerator or air conditioning warm air plenum as possible. Because the amorphous silica attracts microscopic water droplets and molecules from the air (and traps the mold spores, bacterial spores and other small particulates present in the microscopic water droplets) filters 52 can get quite heavy with ice. In such conditions, restraint by two screws is preferable, even though less powder can be hung near the doorframe.

Referring to FIG. 2, the design of temperature pump passive filter 52 allows compact hanging from a two-rail drying rack 60. It is possible to stack more rows of filters 52 for drying if they are hanging from both attachment points in the reprocessing facility, rather than hanging diagonally, taking up more vertical space.

Referring to FIG. 3, a typical air conditioner air handling unit 64 consists of the cooling coil 68, the fan assembly 72, a blow-through filter or filters 70, and the warm air vent 76 through which the warm air flows. This air, although referred to as "warm air," is normally below 26-27° C., the transition temperature, below which the temperature pump passive filters adsorb air pollutants. The air flows in the direction indicated by 66 and 74. Because it is essential to minimize the airborne dust from the amorphous silica (the maximum allowable dust content by federal law is 10 milligrams/cubic meter), it is not desirable to place temperature pump passive filters 52 in the direct air flow of the vents of the air conditioner. Since the temperature pump passive filters 52 attract the microscopic water droplets to them, it is not necessary for them to be in the direct air flow. Far more preferable is to place temperature pump passive filters 52 adjacent to the air flow, where the air can eddy at slow speed through the add-on vent housing 80 shown. A port is cut in the vent, into which filter assembly 78 is placed. A housing containing the required number of temperature pump passive filters 52 (the number is calculated as a function of the volume the air conditioner serves) on a two-rail track 60 is added to the air handler. Access for replacement/reprocessing of filters 52 is provided by the housing access door 84, which is designed to allow the two-rail track to release filters 52, and allow them to be replaced.

Alternatively, temperature pump passive filters 52 may be placed horizontally in the bottom of the warm air vent 76 with equal adsorptive effect. In this case, a door must be cut into the warm air plenum to allow ready access for filter replacement. This abbreviated installation has, in fact, been the form of installation used in commercial installations to date for smaller air conditioners. For large air conditioning systems, a water drain must be provided, because a greater air flow results in more water being deposited in filters 52.

It should be appreciated that the present embodiments provide numerous advantages over prior art. For instance, the former manufacturer of the prior art humidity control panels used plastic clamshells which snapped into each other. In the prior art of concern to the inventor, these panels contained a leaky bag holding a maximum of approximately one kilogram of calcined diatomaceous earth mixed with marble dust. The manufacturer later divulged that this type of diatomaceous earth was carcinogenic. No product was available for warehouse or large refrigerated unit use. The inventor determined to improve on the prior art, and to eliminate any use of carcinogenic calcined diatomaceous earth.

Figure 2:
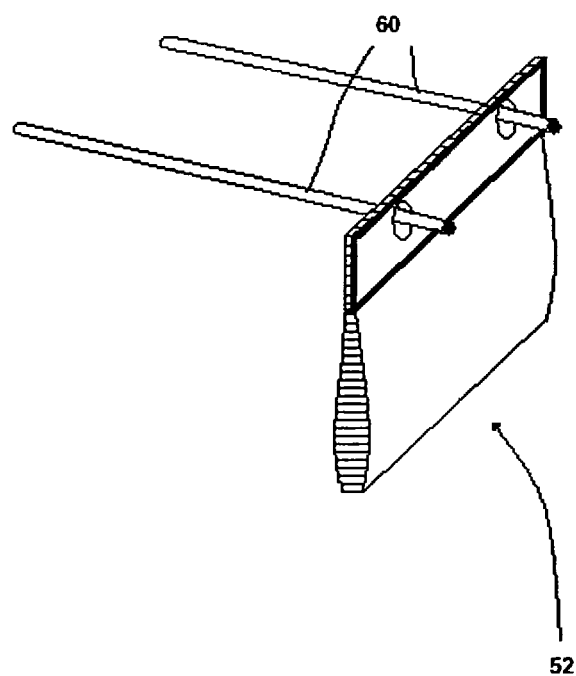
FIG. 2 shows that the design of the temperature pump passive filter allows compact hanging from a two-rail drying rack.
Figure 3:
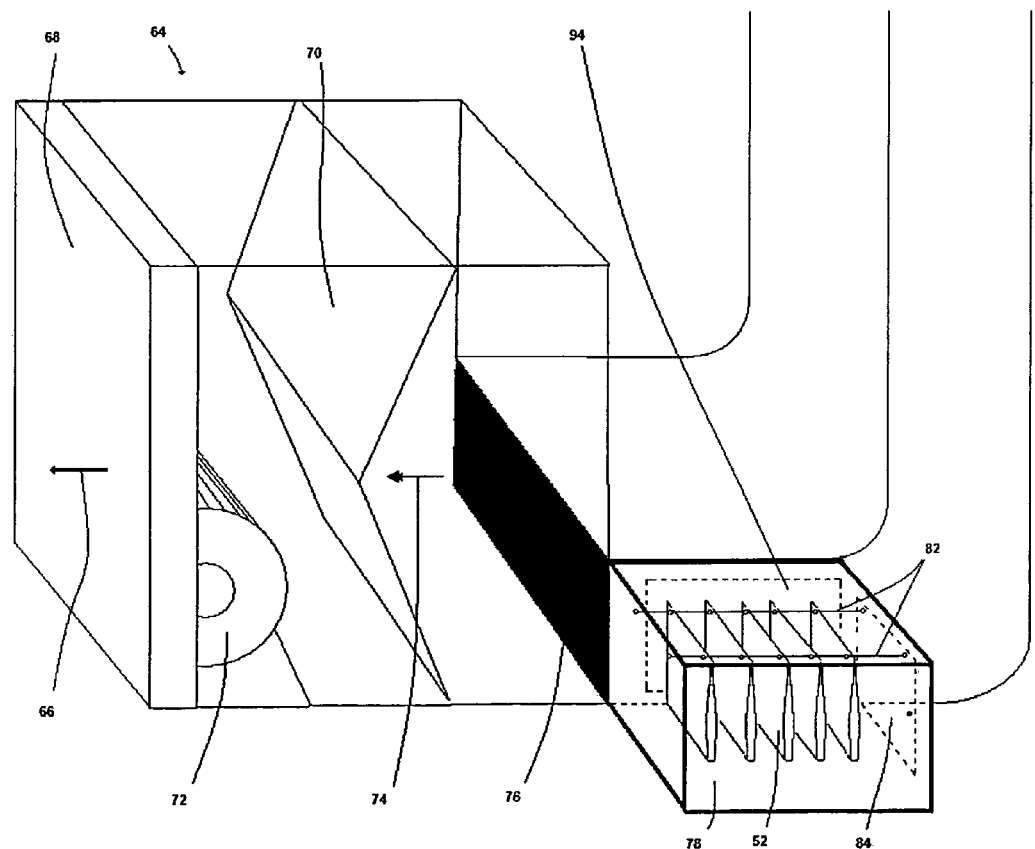
FIG. 3 shows a typical air conditioner air handling unit with temperature pump passive filters installed.

The described temperature pump passive filter 52 provides a delivery system that can hold from 2 to 7 kilograms of amorphous silica powder 40, while hanging in a compact overlapping manner that places much more powder near the doorway, where it is needed. This means that hundreds of pounds of amorphous silica can easily be placed near a large doorway for a warehouse refrigerator or freezer. Large amounts may also be placed adjacent to (or on the floor of) the warm-air plenum of the air supply for an air conditioning system to dry and clean the air prior to its being cooled. The dual grommets in the strength panel allow temperature pump passive filters 52 to adsorb large amounts of water or ice without tearing from the added weight. The design of the filter 52 allows the add-on vent housing 80 shown in FIG. 3 to accommodate enough amorphous silica to serve even large commercial air conditioning systems for indoor air pollution control.

It should be noted that the present embodiments can have numerous variations and modifications. For instance, the outer compartment of the temperature pump passive filter 52 can be made of a number of different types of rough cloth or plastic mesh, so as to provide mechanical support for and protection of the more vulnerable inner compartment of softer melt blown cloth which contains the finely ground amorphous silica. The inner filter compartment or compartments can be fashioned from individual tubes of filter material to accomplish the same slim profile, and minimize settling of the amorphous silica. A number of different fasteners can be used to attach temperature pump passive filters 52 to the wall, with the collar screw and grommet combination only being one of many different connection schemes to attach temperature pump passive filters 52 to the wall. Multiple (in this embodiment two) attachment points allow temperature pump passive filters 52 to be attached to two-rail tracks more compactly, since vertical height of each is minimized. Using only one point of attachment when filter 52 is attached to the wall of a refrigerator, freezer or air conditioning plenum allows filters 52 to be overlapped for more compact location of the amorphous silica to the point at which outside air enters the system, and introduces humidity and other pollutants.

It will be understood that the embodiments described herein are merely exemplary and that a person skilled in the art may make many variations and modifications without departing from the spirit and scope of the embodiments. All such variations and modifications, including those using differing shapes than the rectangular embodiment of temperature pump passive filter 52, and differing shapes and vent locations for the add-on vent housing 80 discussed above, are intended to be within the scope of the embodiments.

Embodiment #2

Large, Improved General Purpose Temperature Pump Passive Filter (No Public Use)

This improved embodiment relates to the design of a temperature pump passive filter, which uses temperature as the key parameter allowing adsorption (The temperature pump in-stroke), storage, and desorption (The temperature pump out-stroke) of gasses, liquids and small particulates. The design allows application of large amounts of mineral in commercial settings.

Through his experiments with Embodiment 1 of large temperature pump air filters 52 the inventor became convinced that a triple-walled filter assembly was a necessity: The design needed was an outer protective bag holding a double-walled inner filter. Then, if a small puncture occurred, the two inner walls not lining up with each other would prevent any significant leakage of mineral into the surrounding air much better than a single-walled filter that was capable of retaining the mineral.

Previous Embodiment 1 filters 52 were sewn together, and could not be opened to change outdated, wet or dirty mineral or to allow the bag to be cleaned. Given that the environments in which these filters are used can be quite challenging, such as in dirty or wet warehouses, or in refrigerators frequently splashed with soups or other foods, frequent changing of the amorphous silica and cleaning of filters may be required to preserve sanitary recycling of the filters.

Embodiment 1 filters have steel grommets for hanging. These grommets rapidly start to rust and lose strength in the wet environments we serve. The new, all polypropylene and plastic design of Embodiment 2 avoids rusting and the consequent waste of damaged filters.

FIGS. 4 and 5 show the design of large, improved general purpose temperature pump passive filter 102. FIG. 4 shows the inner construction of filter 102. Inner filter 86 comprises a melt-blown polypropylene filtration material exterior, with hook and loop strips 88 and 90 positioned on the upper corner to tightly close the mineral in, after amorphous silica 40 is loaded. The next frame down shows the rolled up inner filter 86 (top down), filled with amorphous silica, (shown as item 92) being inserted into an identical filter 86. Inner filter 92 is smoothed into place. Hook and loop strips 88 and 90 of outer filter 86 are then closed to enclose inner filter 86. This generates a double-walled temperature pump passive filter inner body 94, which uses gravity to keep lower hook and loop strips 88 and 90 closed, and has the additional security of upper hook and loop strips 88 and 90 to keep the amorphous silica safely enclosed.

In FIG. 5, double-walled inner body 94 is then inserted into outer protective filter enclosure 104, and attached to it by connecting extended hook and loop surface 90 to interior hook and loop pad 108, which is adhered to the inside of outer enclosure 104. Outer enclosure 104 is then closed over the horizontal member of hanger 110 by folding upper flap 106 along crease 100 to connect hook and look strips 96 and 98. The result is triple-walled temperature pump passive filter 102, which has an inner filter body 94 with two filter walls for increased safety in case of minor puncture, and an outer protective layer of rough cloth for exterior protection. Filter assembly 102 can be used with a large variety of hangers 110, including those of metal or plastic construction, depending on the strength required for a specific application. Another advantage is that only one type of inner filter 86 needs to be manufactured, since the two inner filter layers 86 are identical. A further advantage is that the filter material of the inner filters 86 can be somewhat more permissive (have larger pores than a single inner filter could, but still prevent any leakage of amorphous silica). This allows the resulting filter 102 to adsorb larger pollens and bacteria, because of inner filter 86's double-walled construction.

With the previous design, if a filter became soiled, it had to be discarded. This was wasteful and against our recycling ethos. The design of Embodiment 2 allows quick detachment from the hanger, emptying amorphous silica 40, disassembly of the filter for washing, and refilling and reassembly with no obstacles. The arrangement of filters 86 enlists the help of gravity to seal inner filter 86, and the location of outer filter 86's opening minimizes the possibility of ex-filtration by leaking.

The previous filters had only two layers: An outer protective bag which could not contain the fine amorphous silica dust if the inner bag were somehow punctured, and the inner filter bag. There were a number of instances in which the inner filter bag developed a slight puncture and lost a small amount of mineral into the air. Although a significant leak has never occurred in testing and public use of Embodiment #1, a puncture could conceivably result in the violation of ex-filtration standards of OSHA and the EPA. The new, triple layer design greatly limits the opportunities for leaking or penetration of the inner filter bag, and adds to the overall safety of the design.

The above and other objects and advantages of the present embodiments are achieved in the embodiment illustrated herein by hanging multiple temperature pump passive filters around the outer doors of the refrigerator, freezer or air conditioned area, or by placing the assemblies containing the amorphous silica powder adjacent to the plenum (or if allowed by local Codes, in the plenum) of the air supply of the air conditioning system for an air conditioned area.

The only significant safety limitations on the use of amorphous silica in human-occupied environments regard the discharge of dust into the air. The federal standards for amorphous silica are 6 mg/M$^3$ Total Dust, MSHA, 10 mg/M$^3$ Total Dust, ACGIH. The inventor has run numerous dust samplings of HVAC systems using this type of filter in the last eleven months, and has never measured any detectable amount of amorphous silica dust in the air.

These requirements make a design which virtually eliminates the possibility of ex-filtration of the filter media desirable. Further, the design discussed herein has the many other operational advantages listed above.

The design of improved general purpose temperature pump passive filters 102 makes them usable for scavenging pollutant gasses from enclosed, air-conditioned areas, as well as adsorbing a large variety of particulate pollutants discussed previously.

An additional use for the improved general purpose temperature pump passive filters 102 would be adsorption of the radioactive pollutant gas radon. Our experiments with other pollutant gasses indicate that radon will be strongly adsorbed by filters 102 and rendered harmless by being released to the atmosphere in high radon concentration areas of the U.S.

Improved general purpose filter 102 is advantageous for both home and commercial HVAC applications because of its triple-wall construction, which makes spills or contamination from mineral in the air very unlikely.

Embodiment #3

Suitcase and Hotel Room Freshener Design (No Public Use)

The adsorptive temperature pump passive filter shown in FIG. 6 is intended for use in a suitcase, initially to freshen the suitcase. Accordingly, suitcase filter 114 is sized to fold into three sections within an average sized suitcase. Each section 116 is sized to contain a relatively small amount of amorphous silica, so that the filter is basically flat within the suitcase. The back side of the filter 118 is coated with plastic to allow the owner to spread the filter out on a hotel bed or other furniture, and not allow the filter to be contaminated with smells from contact. The lower view shows the filter in the folded format. The total amount of amorphous silica is enough to rapidly adsorb all odors from the hotel room as well.

Embodiment #4

Anti-Fungal Filter for Shoes (No Public Use)

FIG. 7 shows shoe filter 120, sized to allow easy insertion into an average shoe. The filters adsorb all smells and fungi from shoes. Shoes smell like new for their entire life. Shoe 122 allows the filter to be inserted into the top of shoe 124 into position 126, where it can effectively adsorb. The filter needs to be taken from the shoe and be allowed to air out at room temperature or warmer for 4-6 hours (For example: When shoes are put on, lay the filters on the floor of the closet) to desorb the odors and fungi adsorbed. Upon initial insertion, the filter takes approximately two to three days to adsorb fungi and strong smells from shoes and boots. The filter is also useful in helping to dry wet footware. Shoe filter 120 takes advantage of the slow desorption that occurs even a degree or two (Celsius) below the transition temperature, when the air has a lower partial pressure of pollutants and water vapor.

Embodiment #5

Wall-Mounted Room Air Filters (in Public Use Since Apr. 14, 2009: PPA 61335316 Filed 2010 Jan. 5)

FIG. 8 shows the wall-mounted room air filter 138, mounted in a wood case with bottom plate 130 and sides 132 supporting pegboard perforated material 136. This embodiment supports two small temperature pump passive filters 128, but the design accommodates from one to six filters, depending on the length. Means of attachment 134 include routed holes or hangers. Wall-mounted filter 138 is covered by attractive cloth 140 which allows air penetration to the filters. The cloth has holes 142 allowing proper mounting. Wall-mounted filters 138 cleanse the air of offices and other air-conditioned areas. They are very efficient means of cleaning the air of bacterial, fungal spores, viruses, pollens and other particulate and gaseous pollutants. They typically must be replaced monthly, and are leased under contracts for monthly replacement and reprocessing (drying).

Embodiments #6 and #7

Vent-Mounted Room Temperature Pump Passive Filters (in Public Use Since Apr. 14, 2009: PPA 61/335,316 Filed 2010 Jan. 5)

FIGS. 9a and 9b disclose two designs for warm air return vent temperature pump passive filters for heating, ventilation and air conditioning (HVAC). The two types are Embodiment #6, straight filters, and Embodiment #7, harness filters.

FIG. 9a shows Embodiment #6, straight filter 144, designed to be very thin, and to fit into standard two-vent ceiling warm air return 148 with more than one vent pipe 146. Comprising a filter cloth bag filter surrounded by a formed plastic matrix, which matrix is sewn together around three edges, this filter is thin enough to fit into the standard two vent warm air return 148, and still allow a normal HEPA paper filter 156 to fit over it. This maintains the strongest aspects of both types of filters. The temperature pump passive filter adsorbs even the very smallest pollutant particles, much smaller than the limit for HEPA filters.

FIG. 9b shows Embodiment #7, harness filter 154, which is designed to be very thin, and to fit into standard one vent pipe ceiling warm air return 150. Comprising a cloth bag filter surrounded by a harness-formed plastic matrix, which is sewn together around three edges, leaving one side open into which two long, thin temperature pump passive filters 52 are inserted. Filters 52 slide into harness filter 154, which is thin enough to fit into the commercially standard one vent warm air return 150, and still allow a normal HEPA paper filter 156 to fit over it.

After HEPA filter 156 is inserted into the warm air return housing (shown as 158), warm air return door 160 is closed, covering the entire assembly (See FIG. 10).

Embodiment #8

Sleeping Bag Anti-Mold Storage Filter (No Public Use)

FIG. 11 shows sleeping bag anti-mold storage filter 164.

FIG. 11a shows the top view. Filter 164 comprises 4 or 5 sections 162 having a total combined length of approximately 1.5 to 1.7 meters, and width of 20-25 cm.

FIG. 11b shows the side view.

FIG. 11c shows a cross-section view of section 162. Each section has a small amount of amorphous silica powder 40 in it (enough to attract mold spores, hyphal fragments and odors from the sleeping bag material while the sleeping bag is rolled up and stored).

Embodiment #9

Disposable Paper Temperature Pump Passive Filters to Adsorb Fungal. Spores, Airborne Bacteria, Viral and Other Pollutant Adsorption in Hospitals, Laboratories or Other Hazardous Materials Areas (No Public Use)

FIG. 12 shows disposable temperature pump passive filter 166, which is constructed of existing generation vacuum cleaner bag 170, having means of sealing 168. Vacuum cleaner bag 170 traps particulates between 7 and 10 microns in size. Filter bag 170 is used "in reverse," to restrain small amorphous silica particles 40, which are mostly 10-12 microns in size, while allowing pollutant particulates (mostly under 10 microns in size), such as airborne bacteria, prions, viruses, fungal spores and smaller pollens to be adsorbed by amorphous silica 40. Plastic mesh holder 172 provides support to filter 166. Vacuum bags have been tested successfully as amorphous silica filter bodies. A wall holder of plastic mesh in a plastic bracket holds disposable filters of up to 2 kilograms. Most medical uses and uses in areas containing possibly hazardous materials must use this type of temperature pump passive filter. Electronic fabrication facilities will also require the extreme cleanness possible only with non-reusable, disposable filters. Large shipping containers will also likely use large-scale disposables.

Embodiment #10

Hotel Room Passive Air Filter (No Public Use)

FIG. 13 shows a filter design for use in a hotel room, where the hotel filter assembly 174 must be hidden behind curtains or furniture to prevent guests from taking the filter. Temperature pump passive filter 52 is enclosed in sewn plastic mesh 178, then inserted into bracket 180. Bracket 180 may be fitted with a lock or lock strap to prevent pilferage. Filter 52 keeps the air in hotel rooms completely fresh, eliminating mold odors, mold spores, hyphal fragments, airborne funguses, bacteria, viruses and other disease vectors. Filter 52 also keeps mold from growing on air conditioning equipment, preventing premature failure of equipment due to corrosion accelerated by mold enzymes and excess humidity.

Embodiment #11

Flood Damage Mitigation Assembly with New General Purpose Filters 102 (No Public Use)

FIG. 14 shows mold mitigation assembly 182, comprising new general purpose temperature pump passive filter 102 suspended from pipe 184, supported by concrete board vertical members 186 and horizontal members 188, which form a functional rack for flood damage mitigation. Filter 102 adsorbs mold spores, which are primarily responsible for much of the damage due to floods. Multiple filters will be required, depending on the volume of the area flooded/damaged. Other odors are also adsorbed, eliminating another primary problem associated with flooding.

The same assembly can be used for attic and basement mold remediation.

Embodiment #12

Corrosion Control Filter (No Public Use)

FIG. 15 shows outside electrical or mechanical equipment 190 served by small anti-corrosion filter 194 affixed to the inner lower wall of outer cabinet 192. The amorphous silica temperature pump passive filter encased in plastic filter body having adhesive pad comprising anti-corrosion filter 194 is very effective at decreasing the humidity in outdoor electrical or mechanical equipment. Amorphous silica serves as a catalyst to decrease normal condensation due to dew formation inside this type of equipment. The filter is placed low on the wall of the equipment cabinet to take advantage of the shaded ground temperature of less than 26-27° C. amorphous silica's transition temperature.

A similar filter can preserve papers in and indoor environment, as well as ancient artifacts or drawings. Amorphous silica does not overdry these items as strong desiccants may, since it makes only a weak bond with the water molecule and does not reduce the relative humidity as strongly as some desiccants in a closed cabinet. It releases the humidity adsorbed and stored during the highest humidity part of the day when the relative humidity reaches its lower values in the daily humidity cycle.

Embodiment #13

Bee Hive Virus/Fungus Control Filter (No Public Use)

FIG. 16 shows treated bee hive 196 containing bee hive temperature pump passive filter 202 in the bottom of hive container 198, which has bee accessibility opening 200. Scientists are currently divided on whether the cause of the bee plague is a virus or a fungus. The amorphous silica temperature pump passive filters adsorb both viruses and fungal spores as water micro-droplet nucleation agents. Decreasing the titer of viruses or spores in the air should decrease the expression of the disease in adult bees. Filters 202 take advantage of the shaded ground temperature being under 26° C. throughout most of the world. The bottom of filter 202 is coated with plastic to protect it from wetness. The filter is placed on the ground under the beehive, and requires monthly replacement.

Embodiment #14

Bat Cave Fungus Control Filter (No Public Use)

FIG. 17 shows bat cave temperature pump passive filter 204, consisting of large (approximately 20 kg) amorphous silica filter 208, having plastic cover 206 to protect the mineral from contamination due to bat guano. Drain pan 210, with drain hole 212, protects against cave floor water contamination, which can transform fine amorphous silica powder into a hard pan substance similar to a very soft Plaster of Paris.

Bats are being killed by the millions by White Nose Syndrome (WNS) caused by a white fungus. Fungal spores are directly (and very strongly) adsorbed by amorphous silica. This type of filter would also be appropriate for the preservation of the caveman drawings in Lascaux, France, which are being attacked by funguses, and damaged by cleaning agents applied to deal with the funguses. Adsorbing the spores out of the air is a superior way to deal with this problem. Large filters require replacement every 1-2 months.

Embodiment #15

In-Wall Filters to Eliminate Wall Condensation and Mold (No Public Use)

FIG. 18 shows temperature pump passive filters 52 in use in wall partition 214 inside exterior insulation material 222 between risers 216, over base plate 218. A common problem in humid climates is the formation of condensation on the inner surface of insulative panels used in construction. Amorphous silica decreases humidity and condensation in enclosed spaces. Further, the temperature pump passive filters have been proven to adsorb fungal spores, preventing the growth of mold and other funguses. Filters 52 handle humidity issues in enclosed spaces indefinitely by adsorbing liquid water and desorbing when the daily humidity naturally decreases, and so make an excellent treatment for enclosed wall space in construction. Only a small filter in each course is required. The intention of this embodiment is only to prevent condensation in the wall. The filters 52 last indefinitely for this limited purpose, and thus may be installed permanently.

Embodiment #16

Coating for Dry Wall to Eliminate Wall Condensation and Mold (No Public Use)

FIG. 19 shows an amorphous silica-coated piece of sheet rock wall board 224. The back side (away from the inside wall face) of the sheet rock is treated with amorphous silica coating 226 bonded with odorless adhesive which permits air contact with the mineral. If necessary, the amorphous silica layer can be coated with filter paper to help contain the chalky mineral. Gypsum inner layer 230 provides strength and stability to the board between paper layers 228. Amorphous silica decreases humidity and condensation in enclosed spaces. Further, amorphous silica has been proven by the inventor to adsorb fungal spores, preventing the growth of mold and other funguses. Amorphous silica coating 226 handles humidity issues in enclosed spaces indefinitely by adsorbing liquid water and desorbing when the daily humidity naturally decreases, and so makes an excellent coating for enclosed wall spaces in sheet rock construction. For some purposes, it will be necessary to place an impermeable layer between the amorphous silica layer and the rest of the board.

Embodiment #17

Mineral Matrix Filters (No Public Use)

FIG. 20 shows plastic or fiber glass matrix 236, first impregnated with odorless glue, then internally coated with powdered amorphous silica (shaken into the matrix) to create a very open matrix temperature pump passive filter 232. This filter can be used in many HVAC and other applications. It may require filter paper coating 234 on one or both sides, depending on the application.

Embodiment #18

Bathroom Filter (No Public Use)

FIG. 21 shows bathroom temperature pump passive filter assembly 238. This filter comprises changeable architecturally attractive faces 242 that fit over small T-bracket 244 and are attached with a single screw. Filter bag 240 slides into the face to be held. It is easily removable for replacement and reprocessing (drying).

Embodiment #19

Automobile Odor and Air Pollution Filter (No Public Use)

FIG. 22 shows an embodiment of an automobile odor and air pollution filter 246. Melt-blown polypropylene temperature pump passive filter bag 52 is enclosed in a plasticized cardboard or plastic container 248 having numerous holes 252. Suction cups 250 secure filter 246 to the dashboard or other available surface. The filter is used at the lowest possible location, to keep the temperature at which it operates as low as possible.

The auto owner is advised in the instructions to use filter 246 only at night when the temperature is below about 26-27° C. (about 80° F.). To be effective, filter 246 must be taken out of the auto during the day, because the sun heats the automobile interior to quite high temperatures. If filter 246 is heated above 26-27° C., the air pollution and associated odors will be desorbed into the automobile, and the benefit of the strong adsorption the night before will be lost. Instructions also specify that filter 246 should be left outdoors or at a temperature of over 26-27° C. to allow the air pollution to dissipate.

Embodiment #20

Closet Freshener (No Public Use)

FIG. 23 shows a smaller version of the improved general purpose temperature pump passive filter 102 for use as a closet freshener 254. Closet freshener 254's inner filter 86 contains approximately 10-15% of the amount of amorphous silica used in the design of filter 102, and accordingly is more compact. As with filter 102, a standard closet hanger 110 may be used with closet freshener 254, and flap 106 is attached with the use of hook and loop strip 98. Refer to FIGS. 4 and 5 for construction details.

Embodiment #21

Temperature Pump (No Public Use)

FIG. 24 shows two environmental, perspective views of the major elements of Embodiment #21—temperature pump 282. The embodiment presented is cylindrical with slotted circular vents, but the inventor wishes to stress that the particular shape of the vents or the vent pipe of temperature pump 282 is more a function of the application it addresses, and is not essential to the embodiment. For example, a rectangular vent pipe using louver-type vents could comprise a temperature pump just as well as the designs shown in FIG. 24 or FIG. 25. The key to temperature pump design is allowing the amorphous silica in temperature pump passive filter 52 to adsorb excess humidity, odors, and gaseous and particulate pollutants 274 from indoor air (with inner vent 272 open/outer vent 266 closed) at a temperature of less than 26-27° C. (about 80° F.) at which temperature the amorphous silica adsorbs humidity, as well as gaseous and particulate pollutants. Hours or days later, after temperature pump passive filter 52 has had the opportunity to adsorb a large amount of humidity and pollutants, timer 258 closes inner vent 272, opens outer vent 266, initiates heating of the amorphous silica in temperature pump passive filter 52, dislodging adsorbed humidity, odors, and gaseous and particulate pollutants 274, allowing them to be released into the outside air. Any device using this sequence to eliminate indoor excess humidity and gaseous or particulate pollutants comprises a temperature pump.

FIG. 24a shows temperature pump 282 in the adsorption mode, with inner vent 272 open and outer vent 266 closed. This configuration allows air to be exposed to temperature pump passive filter 52, which adsorbs humidity and pollutants as described above. If temperature pump 282 did not heat filter 52 periodically to dislodge and discharge humidity, odors, and gaseous and particulate pollutants 274, the amorphous silica in filter 52 would eventually fill up with pollutants, leaving it unable to adsorb further. To avoid this, temperature pump passive filter 52 in temperature pump 282 is cycled to a higher temperature daily or weekly (as shown in FIG. 24b) to allow excess humidity and pollutants to escape to the outside air. Timer/on/off switch 258 allows the user to set the periodicity and length of the heating cycles. Vent axle 268 allows only two states for temperature pump 282: Inner vent 272 open/outer vent 266 closed, or inner vent 272 closed/outer vent 266 open. Cylinder-shaped temperature pump passive filter 52 adsorbs excess humidity, odors, and gaseous and particulate pollutants 274 from the air. Note that the air surrounds filter 52, and that filter 52 does not block the air, as in a normal air filter. Again, the particular shape of temperature pump passive filter 52 has no impact, and is strictly a matter of convenience for the given application. Opening inner vent 272 allows indoor air to enter for filtering. Arrow 274 indicates the flow of excess humidity, odors, and gaseous and particulate pollutants by osmosis into cool filter 52. Heat source 276 can be inside temperature pump 282 tube as shown, or can comprise a heating jacket surrounding temperature pump 282 tube. The heat source may also be a heating jacket surrounding a separate large filter plenum as shown in large plenum temperature pump 348 in FIG. 25.

In FIG. 24b, timer/on/off switch 258 energizes power wire to motor/actuator 260 and power wire to heat source 262 through junction box 280. This turns on heat source 276. Motor/actuator 264 opens outer vent 266 and closes inner vent 272 (either by rotating axle 268 to screw it to a new position, or to move it longitudinally to close inner vent 272 and open outer vent 266). Heat source 276 starts to heat the amorphous silica in temperature pump passive filter 52. Increased Brownian motion in filter 52 caused by the heat from heat source 276 causes humidity and pollutant particulates and gaseous molecules to migrate out of the amorphous silica. Concentrated humidity, odors, and gaseous and particulate pollutants 274 emerging from filter 52 are attracted by osmosis into the open air through outer vent 266. Filter 52 is cleansed and prepared for re-use in the next adsorption cycle.

Embodiment #22

Large Plenum Temperature Pump (No Public Use)

FIG. 25 shows an environmental, perspective view of the major elements of alternative Embodiment #22—large plenum temperature pump 348. This view shows cylindrical temperature pump vent pipe 346 in adsorption mode, with circular vent plug to indoor air 334 in the open position. Circular, hinged outlet vent to outside air 336 is in the closed position. Temperature pump vent pipe 346 is attached to large filter plenum 340 containing large amorphous silica temperature pump passive filter 52 to serve extensive indoor areas. Indoor air is exposed to filter 52 through opening to filter plenum 338. Flow of excess humidity, odors, and gaseous and particulate pollutants 274 enters cylindrical vent 346 through open vent plug 334. Humidity and pollutants are attracted by temperature pump passive filter 52, drawn through opening 338 and adsorbed by the amorphous silica in filter 52. Vents are held in inner vent 334 open/outer vent 336 closed position by vent axle 268. Timer 258 is in "Off" position, junction box 280 is not energized, power wire 260 is not energized, motor/actuator 264 is in inner vent 334 open/outer vent 336 closed position, electrical line to heating jacket 262 is not energized, and heating jacket 342 is "Off," cool and surrounded by insulation 344.

FIG. 26 shows an environmental, perspective view of the major elements of Embodiment #22—large plenum temperature pump 348 in the desorption mode. After a period of adsorption of humidity and pollutants into filter 52, timer/on/off switch 258 energizes power wire 260 to motor/actuator 264. Motor/actuator 264 opens circular hinged vent 336 to the outside air, and closes circular vent plug 334 so indoor air can no longer enter large plenum temperature pump 348. At the same time, timer/on/off switch 258 energizes power wire 262, which provides current to heating jacket 342. Heating jacket 342 warms plenum 340 and large temperature pump passive filter 52, providing a sufficient increase in Brownian motion to cause humidity and pollutants to be dislodged from the amorphous silica, creating an upward and outward flow of excess humidity, odors, and gaseous and particulate pollutants 274 to the outside air via open vent 336. Filter 52 is cleansed for re-use. Insulation 344 holds heat in filter plenum 340 for improved heating efficiency.

Embodiment #23

Window-Mounted Temperature Pipe (No Public Use)

FIG. 27 shows an environmental, perspective and cross-sectional views of Embodiment #23—window-mounted temperature pipe 294.

FIG. 27a shows the indoor view of window-mounted temperature pipe 294. There is a continuous flow of excess humidity, odors, and gaseous and particulate pollutants 274 into passive air filter 52 via gap 290, due to attraction of the temperature pump passive air filter 52 for humidity and pollutants at room temperature. It should be clear that this temperature pump passive air filter 52 is not being used in the same way as for temperature pumps 282 and 348 discussed above. Here the excess humidity, odors, and gaseous and particulate pollutants 274 are attracted into passive air filter 52, and move directly through it because of a "draft" created at the other end of filter 52. This "draft" is created in the following manner: There is a release of humidity, odors, and gaseous and particulate pollutants 274 from the outer portion 292 of filter 52 (See FIG. 27a), as angled rain/snow cover 296 (which is painted dull black for maximum solar absorption) and the outer portion 292 of filter 52 are warmed by the outside sun (or alternatively, by optional electrical heat source 276, shown in parentheses in FIGS. 27a and 27c.). Warming causes increased Brownian motion, which dislodges humidity and pollutant gas molecules and particulates from the mineral's matrix, allowing them to rise out of window-mounted temperature pipe 294's exhaust 298. When the upper part of passive air filter 52 has a lower concentration of humidity and pollutants than the lower portion of filter 52, osmosis causes a migration of excess humidity, odors, and gaseous and particulate pollutants 274 upward, similar to the upward draft of a fireplace, though much slower. Excess humidity, odors, and gaseous and particulate pollutants 274 (and a very small amount of air from the indoor space being cleared of pollutants) enter gap 290 below the lowest part of filter 52, and flow into, then through the amorphous silica, to finally escape out exhaust 298 (See FIG. 27c). The tightly packed amorphous silica of Filter 52 serves to mostly block the loss of room air through it, even as it continues to attract and discharge excess humidity, odors, particulate pollutants and gaseous pollutants 274 through osmosis.

Window-mounted temperature pipe 294 has front cover 302, mounted on hinges 58, connected to top ledge 288 with latch 306. Pulling cover 302 open with cover handle 304 allows access to passive air filter 52 for removal and replacement, if necessary. Window frame 284 containing window pane 286 is raised a few inches. Window-mounted temperature pipe 294 is placed on the window sill. Temperature pipe 294 provides conventional adjustment means to expand each side to the sides of the window, if the fit is not exact, and to secure temperature pipe 294 and window against intrusion. Passive air filter 52 extends from the inside, under window frame 284, into outer portion of window-mounted temperature pipe 294.

FIG. 27b shows the outdoor view of window-mounted temperature pipe 294. Outer portion 292 of filter 52 is protected by angled rain/snow cover 296. Outer portion 292 is painted dull black 318, to maximize collection of solar heat to warm passive air filter 52 to promote humidity and pollutant removal. Excess humidity, odors, and gaseous and particulate pollutants 274 flow out exhaust slot 298 into the open air.

FIG. 27c shows the cross-sectional view of the major elements of window-mounted temperature pipe 294 with respect to window frame 284 and to wall 300. The overall effect of window-mounted temperature pipe 294 is to get rid of humidity and pollutants better than leaving the window open, with nearly no loss of conditioned air. The inside air continues to get cleaner and cleaner as pollens, bacteria, fungal spores and other dangerous particulates are adsorbed and exhausted. Avoiding air loss minimizes energy losses both in summer and winter weather.

Embodiments #24 and #25

Wall-Mounted and Roof-Mounted Temperature Pipes (No Public Use)

FIG. 28 provides environmental, cross-sectional views of Embodiment #24—wall-mounted temperature pipe 310, and Embodiment #25—roof-mounted temperature pipe 322.

FIG. 28a shows the design of Embodiment #24—wall-mounted temperature pipe 310, with inner vent 272 located a short distance above floor 320, with vertical (or upward slanted) portion 316 of temperature pipe 310 rising to allow sunlight to warm it. Upper portion 316 is painted dull black 318 for increased solar absorption), and is covered by protective rain/snow cap 312 to keep passive air filter 52 dry. Humidity, pollutant gasses and particulates enter inner vent 272, attracted by cool amorphous silica in the bottom of the lower end of passive air filter 52. Mineral at the inlet is cooled by the building's air conditioning, is kept below the transition temperature of 26-27° C. (about 80° F.), and accordingly continues to attract a flow of humidity and pollutants 274. Pollutants trapped in the amorphous silica in lower portion of wall-mounted temperature pipe 310 then face the following osmotic "choice." They could migrate back into the cool room, but the room has a higher concentration of pollutants than in the amorphous silica at the lower portion of pipe 310. During daylight hours, if the sun is shining on temperature pipe 310, the amorphous silica in the upper portion 316 is warmed by sunlight falling on dull black paint 318 to a higher temperature than the amorphous silica in the lower part of pipe 310. This increases the temperature of the upper part of passive air filter 52 above the transition temperature, driving pollutants out of filter 52 by increased Brownian motion. The top of passive air filter 52 then has a low concentration of humidity and pollutants, while the cool, lower part of filter 52 has a higher concentration. The low concentration in the top of passive air filter 52 creates an attraction vector and consequent flow of excess humidity, odors, and gaseous and particulate pollutants 274 up wall-mounted temperature pipe 310, until this flow is released at the top of pipe 310 by the warm amorphous silica. At the same time, flow of conditioned air out of pipe 310 is largely prevented by the packed amorphous silica powder in filter 52, which blocks pipe 310. This avoids loss of energy that would otherwise occur by simple venting of conditioned air from the interior, while cleaning the air better than a vent pipe could over a period of time.

FIG. 28b shows Embodiment #25—roof-mounted temperature pipe 322, also with long, narrow passive air filter 52 blocking the air flow to mostly prevent the loss of conditioned air. Roof-mounted temperature pipe 322 is somewhat less effective in completely evacuating pollutants from an indoor area, since many large pollens and larger, heavier particulates tend to concentrate lower in the room because of gravitational attraction, which ultimately causes them to precipitate out of the air. However, many of the smaller pollutants and pollutant gasses rise to the ceiling because of the higher temperatures present there. They are effectively propelled upward by collisions with molecules of the air. These pollutants are attracted to roof-mounted temperature pipe 322 as long as the lower portion of passive air filter 52 is kept below the aforementioned transition temperature. Rising temperatures farther up the pipe in the attic and at the roof line clear the upper reaches of filter 52 of pollutants, creating a "draft" of humidity and pollutants up the pipe and out into the atmosphere: The packed amorphous silica powder in filter 52 blocks most of the conditioned air that would otherwise flow through roof-mounted temperature pipe 322, saving a great amount of utility expense, while cleaning indoor air of excess humidity, pollutant particulates (especially the very small particulates that are believed to be the strongest threats to human health), and pollutant gasses.

Embodiment #26

In-Wall Temperature Pipe (No Public Use)

FIG. 29 provides an environmental, perspective view of Embodiment #26—in-wall temperature pipe 326. In-wall temperature pipe 326 is held in place by floor supports 330 and side supports 328. This view shows timer/on/off switch 258, junction box 280, wall current source 278, electrical heat source 276 and wall risers 216. Inner vent 272 is always open to indoor air. Outer vent 266 is always open to the outside air. Angled rain/snow cover 296 protects filter 52 from rain and snow. The amorphous silica at the bottom of filter 52 remains at the temperature of the air-conditioned indoor air, which is generally well below the transition temperature of 26-27° C. (about 80° F.). At this temperature, the mineral attracts into its matrix excess humidity, gaseous pollutants and small particulates which are the nucleation agents for micro-droplets of water in the air. Inner vent 272 is located close to the floor to attract all pollutants, including heavier pollens, larger airborne bacteria, and larger fungal spores. Either due to the natural, solar-heated gradient of wall temperature in warm climates, or due to heating from heat source 276 when the outside temperature is cooler, the mineral higher in passive air filter 52 is above the transition temperature, while the mineral at the bottom of the filter is not. Thus, the increased Brownian motion dislodges pollutant gases and particulates from the upper amorphous silica in the filter. The relative absence of pollutants higher in the filter creates an osmotic attraction vector for pollutants in the upward direction, causing a "draft" of excess humidity, odors, and gaseous and particulate pollutants 274. Heat rising up in-wall temperature pipe 326 also warms the entire upper part of filter 52, increasing flow of excess humidity, odors, and gaseous and particulate pollutants 274 to outside air through in-wall temperature pipe outer vent 266.

FIG. 30 shows the arrangement of insulation required for in-wall temperature pipe 326. Wall insulation 332 is placed outside in-wall temperature pipe 326 to maximize retention of heat in a cold climate, or on cool days in a warm climate. On warm days, no heating by heat source 276 is required, since the heat at un-insulated outer vent 266 is enough to heat the top of large passive air filter 52 above the transition temperature to create an upward "draft" of excess humidity, odors, and gaseous and particulate pollutants 274.

Embodiment #27

Air Conditioning Temperature Pipe (No Public Use)

FIG. 31 shows two views of Embodiment #27—air conditioning temperature pipe 350, and a view of back-flow prevention valve 380 which is used to prevent hot outside air from entering the air conditioning system while air handler 354 is operating.

FIG. 31a shows Embodiment #27—air conditioning temperature pipe 350 located on warm air return vent 366 of air handler unit 354. This design uses the warm/hot air in the attic, other air handler room or outside air as a heat source driving the temperature pump cycle to remove pollution from the cool re-circulated air. Since the re-circulated air is typically less than the transition temperature of 26-27° C. (about 80° F.) both in summer and during the winter heating season, the re-circulating air itself keeps the amorphous silica near the vent cooled to a temperature at which it can adsorb pollutants while the air handler is running. A hole is cut in the return air vent to expose temperature pipe inlet 356 to the re-circulated air. Pollutants are attracted into body of temperature pipe 360 through rectangular base 362. The base in this embodiment is rectangular to facilitate connection to rectangular warm air return vent 366 using air conditioner tape, but the shape of the connection or the device is not essential to the embodiment. Any means of exposing an amorphous silica filter to the flow of return air and subsequently venting pollutants to the attic, air handler room (and thence to the outside air) or directly to the outside air is covered in the claims herein. The high temperature of the attic (up to 54° C. or about 130° F.) or outside air (up to 35° C. or about 95° F.) serves as a heat source to warm the upper part of the amorphous silica in temperature pipe body 360, causing upward "draft," or flow of pollutants 374 which flow is then discharged through capped vent 358 into the attic air, other air handler room air, or directly to the outside air. Backflow prevention valve 380 (See FIG. 31b) prevents backflow of air from warm outer air into the air conditioner vent, if the negative pressure on the warm air side of the system is great enough to draw air (and pollutants) back into warm air return vent 366. Small amounts of air escaping from vent 358 are well vented to the outside air, where it is safe to discharge the trace pollutants adsorbed from the re-circulated air of the air conditioning system. The warm temperature of this air when it is discharged from temperature pipe vent 358 allows it to rise into the outside air. Air flow (return air) 364 inside air handler 354 is thus purified of pollutants, and proceeds through the air handler to become "conditioned air" 368, that is, cooled air in summer and warmed air in winter, distributed as conditioned air through vent 352 and thence throughout the air conditioned volume served by air handler 354. When the air handler 354 fan is operating, there is normally negative pressure at this point in the venting. Thus, temperature pipe body 360 will normally be adsorbing pollutants (with backflow prevention valve 380 closed) when air handler 354 is operating, and desorbing pollutants (with backflow prevention valve 380 open) to outside air when air handler 354 is not operating.

FIG. 31b shows Embodiment #25—expanded view, air conditioning temperature pipe 370. Temperature pipe body 360 is surrounded by insulation 372 to help keep the lower portion of the amorphous silica cool, so it can adsorb pollutants, and transfer them upward into the warmer portion of temperature pipe 370. Spring-loaded backflow prevention valve 380 in vent to outside air 358 closes to prevent backflow of air from the warm outer air into the air conditioner vent, if the negative pressure on the warm air side of the system is great enough to draw air (and pollutants) back into warm air return vent 366. Pollutants 374 flow through vent cap 376 into the attic or other air handler room air, and thence into the outside air (or directly into the outside air).

FIG. 31c shows expanded view, backflow prevention valve 380. This valve provides conventional means of preventing backflow of attic air into temperature pipe 370. FIG. 31c is only illustrative of one possible embodiment of a backflow prevention valve, comprising hinge 58, flapper valve plate 62, which is normally kept open by axle and weak resistance spring 112, but in the presence of backflow air is drawn shut over opening 256 to prevent backflow of warm outer air and pollutants into warm air return vent 366.

Operation

The embodiments discussed in this regular patent application feature four separate methods of operation:

(a) The temperature pump passive filters embodiments: Embodiments #1-#11, #13-#14, and #18-20 are typically placed into an air volume, and function to attract air pollutants to them. They normally must be replaced with reprocessed (dried) filters every 1-2 months, which makes them very amenable to a leasing operation. Specific operational needs for each embodiment are discussed in the sections above.

(b) Embodiment #12—corrosion control filter, Embodiment #15—in-wall filters to eliminate wall condensation and mold, and Embodiment #16—coating for dry wall to eliminate wall condensation and mold, operate continuously to prevent condensation in enclosed walls. The amorphous silica inner coating prevents liquid water condensation on a cool surface. This means that the enclosed space does not become an attractive location for the growth of microscopic bacteria, molds or other fungal spores. When relative humidity in the enclosed space approaches 100%, the amorphous silica adsorbs excess humidity so that the dew point is never reached, and condensation does not occur. When the relative humidity decreases, due to natural fluctuations in relative humidity in the enclosed space, the amorphous silica desorbs the water molecules it previously adsorbed, thus acting to keep the enclosed space forever dry. This is a vast advantage, especially in very humid environments. Furthermore, any airborne bacteria or mold or other fungal spores that happen to enter the enclosed air space are attracted to and sequestered in the amorphous silica powder. They are thus prevented from gaining access to the liquid water they require to grow. Corrosion is likewise prevented by the absence of liquid water condensation. Very tight building construction as currently practiced tends to result in inner wall condensation, and consequent mold contamination. This contamination is eliminated by Embodiments #12, #15 and #16.

(c) Temperature pump embodiments: Embodiment #21—temperature pump, and Embodiment #22—large plenum temperature pump, allow the amorphous silica to adsorb excess humidity, odors, and gaseous and particulate pollutants from indoor air at a temperature of less than 26-27° C. (about 80° F.) at which temperature the amorphous silica adsorbs humidity, as well as gaseous and particulate pollutants. Hours or days later, after the temperature pump passive filter has had the opportunity to adsorb a large amount of humidity and pollutants, a timer closes the inner vent, opens the outer vent, and initiates heating of the amorphous silica, which heating dislodges adsorbed humidity, odors, and gaseous and particulate pollutants, allowing them to be released into the outside air.

(d) Temperature pipe embodiments: Embodiment #23—window-mounted temperature pipe, Embodiments #24—wall-mounted temperature pipe, Embodiment #25—roof-mounted temperature pipe, Embodiment #26—in-wall temperature pipe, and Embodiment #27—air conditioning temperature pipe, all operate in a similar fashion. Amorphous silica at the bottom of the temperature pump passive filter which fills the temperature pipe remains at the temperature of the air-conditioned indoor air, which is below the transition temperature of 26-27° C. (about 80° F.). At this temperature, the mineral attracts into its matrix excess humidity, gaseous pollutants and small particulates which are the nucleation agents for micro-droplets of water in the air. This includes pollutants, pollens, larger airborne bacteria, and larger fungal spores. Either due to the natural, solar-heated gradient of wall temperature in warm climates, or due to heating from a heat source when the outside temperature is cooler, the mineral higher in the temperature pipe filter is above the transition temperature, while the mineral at the bottom of the filter is not. Thus, the increased Brownian motion dislodges pollutant gases and particulates from the upper amorphous silica in the filter. The relative absence of pollutants higher in the filter creates an osmotic attraction vector for pollutants in the upward direction, causing a "draft" of excess humidity, odors, and gaseous and particulate pollutants. Heat rising up the temperature pipe also warms the entire upper part of the temperature pipe filter, increasing flow of excess humidity, odors, and gaseous and particulate pollutants to the outside air through the temperature pipe outer vent. The temperature pump and temperature pipe embodiments are designed to operate automatically without inspection or maintenance for periods of a year or longer. The only inspections of any importance are to check that the heat cycling equipment is functioning, and that the amorphous silica filters have not become soiled or clogged by a spill or accident. With proper heat cycling, the temperature pump passive filters in both of these devices have expected lives of 5-10 years.

CONCLUSION, RAMIFICATIONS, AND SCOPE

The reader will see that the three major categories of temperature pump filters—stationary filters for many different applications, coatings for building materials, and automated devices—provide new and non-obvious applications of the properties of pure (non-calcined) amorphous silica, which have been discovered by the inventor and others. The ability of these filters, filter coatings and automated devices to:
  save up to 45% of the electricity for refrigerators and freezers
  save up to 30% of the electricity for air conditioning
  virtually completely eliminate indoor air pollution of all types through osmosis, including:
    excess humidity
    ethylene gas
    chlorine gas
    other trace gas pollutants
    acetic acid molecules
    other acid molecules
    objectionable odors
    ascospores
    aspergillus spores
    penicillium spores
    basidiospores
    cladosporium spores
    stemphylium spores
    most of the total fungal spore count
    mold spores
    airborne bacteria in general
    small hydrocarbons, viruses and prions
    pollens
    hyphal (mold) fragments
    insect fragments
    dust
    dust mites
means that the disclosed embodiments have the possibility of making significant impacts in a number of fields.

Although the descriptions above contain many specificities, these should not be construed as limiting the scope of the embodiments but as merely providing illustrations of some of the present embodiments. For example, temperature pumps and temperature pipes can have many shapes, inlet and outlet vent arrangements, heating arrangements, and specific air or gas purification purposes. Thus, the scope of the embodiments should be determined by the appended claims and their legal equivalents, rather than by the examples given.

I claim:

1. A passive air pollution filtration system comprising: a passive air filter with a filter bag portion, amorphous silica, and a means of attachment or restraint; the filter bag portion having at least one layer of filtration material; the filter bag portion having a first filter bag with a layer of filtration material and having either an outer protective bag surrounding the first filter bag or a second filter bag wherein the second filter bag is identical to the first filter bag wherein the first bag is inserted top down into the second filter bag, the second filter bag closed by a means of restraint; an outer protective bag surrounding the second filter bag; the amorphous silica is non-carcinogenic, uncalcined natural diatomaceous earth, and is contained and restrained within the first bag; said filter bag has a transition temperature of about 26-27° C. when placed in an indoor air volume or volume of other gas, the transition temperature defined as the temperature above which amorphous silica ceases adsorbing and begins to desorb water molecules, other adsorbed gaseous molecules and small particulates due to increased Brownian Motion; said passive filters requiring no fan or other air moving means, pollutants being absorbed via osmosis in cool air below the transition temperature; the filter system can be regenerated by physical removal from the air volume or other gas volume after a period of use by heating the filter system in either sunlight or a heating chamber to a temperature above the transition temperature for a sufficient period of time such that the filter is regenerated and the filter system is returned to service in the air volume or other gas volume.

2. The passive air filter of claim 1, wherein the at least one layer of filtration material is selected from the group consisting of: filter paper and melt-blown polypropylene cloth.

3. The passive air filter of claim 1, wherein the outer protective bag is made of material selected from the group consisting of: rough air-permeable cloth, vacuum cleaner bag, and plastic.

4. The passive air filter of claim 1, wherein a means of restraint is selected from the group consisting of: grommets, a bracket, hanger, box enclosure, hook and loop, and adhesives.

5. The passive air filter of claim 1 wherein said passive air filter further comprises an inner filter container of melt blown polypropylene cloth, and an outer container of rough, porous cloth, both folded over into a thick strength panel, and sewn together with a sturdy horizontal seam into which two steel grommets are inserted to allow hanging by one grommet in an enclosed air volume treated, or by two grommets for drying, and having a vertical seam down the center of the passive air filter.

6. The passive air filter of claim 1 wherein said passive air filter is located adjacent to an air flow in a warm air return of an air conditioning system; a housing which allows air flowing through an opening in the warm air vent to eddy through said passive air filter at slow speed and then return to the conditioned stream of air; wherein the housing providing a means of hanging the filters, and a means of access to change out the filters on a periodic basis; and if the air conditioning system contains accessible floor space, the filters may be placed on said floor space.

7. The passive air filter of claim 1, wherein said filter bag is formed into a series of filter compartments in a long strip which may be folded or rolled up to provide air purification for an article; wherein the filter bag is removable and which may be taken out of said article to also provide room air purification for enclosed volume of air as needed.

8. The passive air filter of claim 1, wherein the passive air filter is mounted inside an outer container which may be coated with plastic to protect one or more sides of the filter from moisture; wherein the filter may be placed in a protective drain pan and which may have a hook and loop connection or other means of filter adhesion.

9. The passive air filter of claim 1, wherein the passive air filter is formed into a small, flexible insert.

10. The passive air filter of claim 1, wherein the passive air filter is produced in embodiments suitable to be inserted into wall or ceiling-mounted filter assemblies.

11. The passive air filter of claim 1, wherein the passive air filter is formed into a plastic matrix which fits into existing, commercially available ceiling warm air return vent filter assemblies, with one or two pipes, and which plastic matrix also allows use of the standard HEPA air filter as well.

12. The passive air filter of claim 1, wherein the passive air filter is designed for permanent installation into a wall or permanently enclosed air space for protection against condensation and mold or bacterial growth.

13. The passive air filter of claim 1, wherein the passive air filter is constructed exclusively of filter paper and an outer enclosure being designed to allow for disposable use.

14. The passive air filter of claim 1, wherein the passive air filter is constructed having an inner filter, a perforated exterior container, and suction cups for attachment.

15. The passive air pollution filtration system of claim 1, wherein the passive air filter is incorporated into an automated temperature pumping device, referred to herein as the temperature pump, the temperature pump comprising: a vent section having an air inlet from said indoor air space, and an air outlet to the outside air, in which the inlet and outlet may not be open at the same time; the passive air filter between the inlet and outlet, adjacent to which the air to be filtered may flow while the inlet from the indoor air space is open and the outlet to the outside air is closed; a means of simultaneously closing the air inlet while opening the air outlet, and at the same time initiating a heating sequence to allow a heat source to heat said passive air filter to a temperature above said transition temperature; timer circuitry to cause the above vent section to keep the air intake from the indoor air space open while keeping the outlet to outside air closed; said timer circuitry periodically closing the intake, opening the outlet and at the same time initiating a heating sequence to heat the passive air filter to a temperature above said transition temperature; a heat source controlled by the timer circuitry, capable of warming the passive air filter above said transition temperature.

16. The temperature pump of claim 15, wherein the vent section comprises a large add-on plenum below the vent section to hold a passive air filter of claim 1, in which the vent section has an opening to allow indoor air to enter the add-on plenum for adsorption, and the vent may be closed to allow desorption of said humidity, odors, pollutants and allergens to the outside air, and which add-on plenum may have a heating jacket or other heat source to raise the filter's temperature above said transition temperature for desorption.

17. The passive air pollution filtration system of claim 1, wherein the passive air filter is incorporated into an automated temperature pumping device, referred to herein as the temperature pipe, comprising:
an intake vent allowing contact with the indoor air, installed in a window, in an exterior wall, through an exterior wall or through the ceiling; a pipe of any shape, forming the body of the temperature pipe; a vertical gap between a intake vent and a bottom of the passive air filter of claim 1, to help prevent humidity, odors, particulate air pollutants, gaseous air pollutants, and allergens from re-entering the indoor air after being adsorbed by said passive air filter; the passive air filter of claim 1 completely blocking the temperature pipe inside diameter at a point near enough to the air-conditioned indoor air so that the part of the filter nearest the indoor air will be cooled by the indoor air and stay under the transition temperature; a section of the temperature pipe which vents to outdoor air, is higher than the indoor section of the temperature pipe, and which may be heated by the group consisting of solar energy absorbed by black painted outer surfaces, waste heat such as attic air, and electricity, causing the humidity, odors, particulate air pollutants, gaseous air pollutants, and allergens there to desorb and be released into the upper section of the temperature pipe for discharge into the atmosphere, thereby creating an upward flow of humidity, odors, particulate air pollutants, gaseous air pollutants, and allergens by osmosis from a lower part of the passive air filter to an upper part of the filter; the upward flow is then to be desorbed and discharged into the atmosphere.

18. The temperature pipe of claim 17 wherein the said temperature pipe has timer circuitry and a means of electrical heating to periodically initiate a heating sequence to heat an upper part of the passive air filter to a temperature above the transition temperature, causing the amorphous silica to desorb the humidity, pollutant gasses, odors, pollutant particulates and allergens to the outside air, creating an upward draft of pollutants within the temperature pipe.

19. The temperature pipe of claim 17 wherein the said temperature pipe has a backflow prevention valve which eliminates the possibility of returning polluted air to the air which is being filtered.

20. The temperature pipe of claim 17, comprising: a warm air return vent of an air conditioning system air handler unit; the temperature pipe using the warm air of the attic, air handler room, or outside air to provide energy to purify cool air returning as warm air to the air handler; while the air handler is on, the temperature pipe's passive filter adsorbing excess humidity and pollutants from the air flowing by the filter, the backflow prevention valve remaining closed to prevent the backflow of warm outside or attic air into the air handler; upon the air handler fan turning off, the backflow prevention valve opens, the temperature pipe filter warms due to the warm air around it, desorbing pollutants and excess humidity from the top of the passive air filter out into the warm air of the attic or air handler room, and thence to the outside air, or directly into the outside air.

* * * * *